(12) United States Patent
Barefoot

(10) Patent No.: US 10,435,105 B2
(45) Date of Patent: *Oct. 8, 2019

(54) RAMP CONTROL FOR A FRONT FORK OF A BICYCLE

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/398,286

(22) Filed: Jan. 4, 2017

(65) Prior Publication Data

US 2017/0113755 A1    Apr. 27, 2017

Related U.S. Application Data

(63) Continuation of application No. 14/676,071, filed on Apr. 1, 2015, now Pat. No. 9,573,649.

(60) Provisional application No. 61/974,469, filed on Apr. 3, 2014.

(51) Int. Cl.
| | |
|---|---|
| *B62K 25/08* | (2006.01) |
| *F16F 9/00* | (2006.01) |
| *B62K 25/04* | (2006.01) |

(52) U.S. Cl.
CPC ............. *B62K 25/08* (2013.01); *F16F 9/00* (2013.01); *B62K 2025/048* (2013.01)

(58) Field of Classification Search
CPC .. B62K 25/08; B62K 21/02; F16F 9/00; F16F 9/446; F16F 9/512; F16F 9/5126

USPC .............. 188/282.1–282.6, 322.13, 313; 280/124.1, 276, 5.515

See application file for complete search history.

(56) References Cited

U.S. PATENT DOCUMENTS

| | | | |
|---|---|---|---|
| 2,101,265 A | 12/1937 | Mercier | |
| 4,122,923 A | 10/1978 | Ellis et al. | |
| 5,417,446 A | 5/1995 | Pileggi | |
| 5,775,677 A | 7/1998 | Englund | |
| 5,848,675 A * | 12/1998 | Gonzalez ............... | B62K 25/08 |
| | | | 188/319.2 |
| 6,095,541 A | 8/2000 | Turner et al. | |
| 6,217,049 B1 * | 4/2001 | Becker ................... | B62K 25/08 |
| | | | 188/285 |
| 7,641,028 B2 | 1/2010 | Fox | |
| 7,703,585 B2 | 4/2010 | Fox | |
| 8,464,850 B2 * | 6/2013 | Fox ........................ | B62K 25/08 |
| | | | 188/322.13 |
| 8,622,180 B2 * | 1/2014 | Wootten ................. | F16F 9/461 |
| | | | 188/278 |
| 8,752,681 B2 | 6/2014 | Fox | |
| 9,415,653 B2 | 8/2016 | Franklin et al. | |
| 9,567,029 B2 | 2/2017 | Fox | |

(Continued)

*Primary Examiner* — Christopher P Schwartz
(74) *Attorney, Agent, or Firm* — Jason H. Foster; Kremblas & Foster

(57) ABSTRACT

A suspension unit for a front fork of a vehicle includes an annular tube. The first tube defines a compression chamber and a damping chamber. A damper includes a first valve allowing gas to variably flow from the compression chamber to the damping chamber and a second valve allowing gas to flow from the damping chamber to the compression chamber. An external adjuster allows a rider to adjust the first valve to improve ride conditions.

45 Claims, 11 Drawing Sheets

(56) References Cited

U.S. PATENT DOCUMENTS

| | | | |
|---|---|---|---|
| 9,573,649 B2* | 2/2017 | Barefoot | F16F 9/00 |
| 9,796,447 B2 | 10/2017 | Fox | |
| 9,802,670 B2 | 10/2017 | Fox | |
| 2005/0104320 A1* | 5/2005 | Wesling | B62K 25/08 |
| | | | 280/276 |
| 2006/0091345 A1* | 5/2006 | Jordan | B60G 17/08 |
| | | | 251/251 |
| 2008/0296814 A1 | 12/2008 | Franklin et al. | |
| 2009/0236807 A1 | 9/2009 | Wootten et al. | |
| 2010/0225081 A1* | 9/2010 | Galasso | B62K 25/08 |
| | | | 280/124.1 |
| 2011/0121525 A1* | 5/2011 | Shirai | B62K 25/08 |
| | | | 280/5.515 |
| 2013/0118847 A1 | 5/2013 | Krahenbuhl et al. | |
| 2013/0134687 A1* | 5/2013 | Laird | B60G 17/052 |
| | | | 280/276 |
| 2015/0054253 A1* | 2/2015 | Pye | B62K 25/08 |
| | | | 280/276 |
| 2016/0348747 A1 | 12/2016 | Franklin et al. | |
| 2017/0106937 A1 | 4/2017 | Fox | |
| 2017/0356518 A1 | 12/2017 | Gustafsson Vallander et al. | |
| 2018/0057100 A1* | 3/2018 | Fox | B62K 25/08 |

* cited by examiner

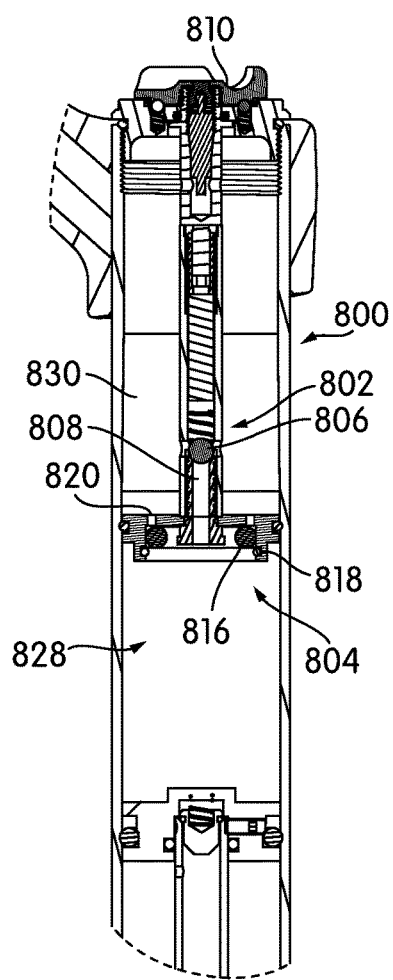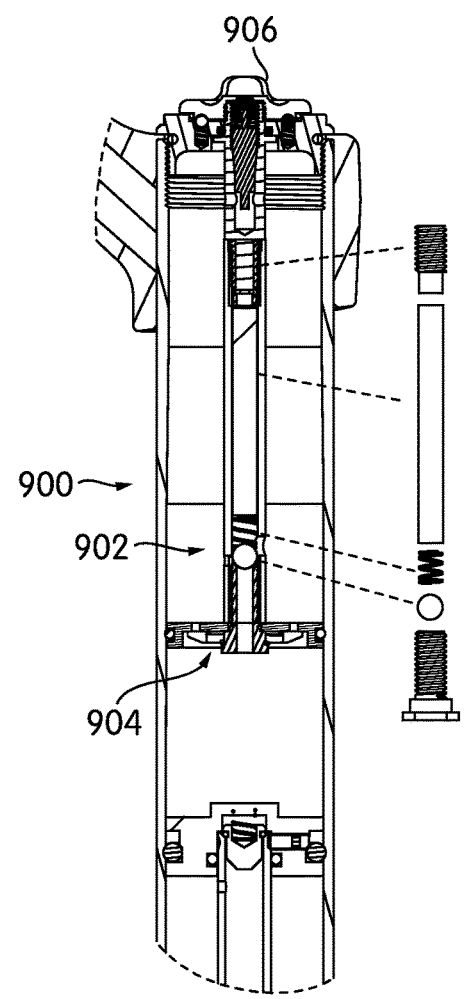
FIG. 8
FIG. 9

RAMP CONTROL FOR A FRONT FORK OF A BICYCLE

CROSS-REFERENCES TO RELATED APPLICATIONS

The present application claims priority to U.S. Provisional Patent Application Ser. No. 61/974,469 and U.S. patent application Ser. No. 14/676,071, now U.S. Pat. No. 9,573, 649, the disclosures of which are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates generally to suspension components on vehicles. More particularly, the present disclosure relates to a shock absorber with an external, on-the-fly adjuster to vary damping of a suspension for use on a bicycle.

For many cyclists, it is important to be able to vary the rate at which the front fork of the bicycle compresses when it hits an obstacle. Some cyclists prefer a stiffer feel, while others prefer a softer feel. Still others have differing preferences depending on the particular terrain and objects likely to be encountered in an off-road context.

Shock absorbers that support the weight of the vehicle with compressed gas or another compressible gas instead of coil or leaf springs may be attractive for applications where the weight of components must be kept as low as possible. Moreover, gas spring shocks may allow for convenient adjustability of the spring rate of the suspension, in some cases by increasing or decreasing the volume of gas within the shock.

In many conventional devices, an air spring is commonly used in conjunction with a damping device to control compression and rebound, at least in part. The damping device conventionally controls damping by controlling the flow of a substantially incompressible fluid. Making changes to the damping characteristics of the damping device, particularly during a ride, may be complicated. Further, such adjustments are often only useful to change the damping characteristics over a certain range of travel of the fork, while leaving the damping characteristics at other ranges of travel unaffected.

The need therefore exists for a shock absorber that allows a rider to adjust the damping rate by controlling the flow of a compressible gas within a fork. Using such a system, a rider can adjust the ride feel on the fly.

BRIEF SUMMARY OF THE INVENTION

In one embodiment, a suspension unit for a bicycle may include an annular tube, a piston, a barrier assembly, and a first valve. The annular tube may define a compression chamber. The piston may slidingly interfit with the annular tube and be capable of compressing a compressible gas in the compression chamber. The barrier assembly may be remote from the piston. The barrier assembly may include a damping barrier near one end of the annular tube. The compression chamber may be on one side of the barrier assembly and a damping chamber may be on another side of the barrier assembly. The first valve may be operatively between the compression chamber and the damping chamber. The first valve may be capable of permitting the compressed gas to flow between the compression chamber and the damping chamber. An effective force may be applied to a blocker in the first valve, the effective force influencing a threshold level of force of compressed gas in the compression chamber capable of opening the first valve.

The effective force may be at least partially applied by a bias. The bias may be a spring. The blocker may comprise a resilient material. The resilient material may apply at least part of the effective force. The barrier assembly may be connected to the tube in a substantially fixed position. The barrier assembly may be adjustably connected to the annular tube. The barrier assembly may be located substantially within the annular tube. The suspension unit may further include an adjuster. The adjuster may be operatively connected to the first valve and may be capable of adjusting at least a portion of the effective force. The barrier assembly and a shaft connecting the barrier assembly to the annular tube may at least partially define a serpentine passageway. A second valve may be operatively between the compression chamber and the damping chamber and may be capable of permitting the compressible gas to flow between the damping chamber and the compression chamber.

In another embodiment, a suspension unit for a bicycle includes an annular tube, a movable piston, a damping barrier, and a first valve. The annular tube may define a compression chamber and a damping chamber, each of the compression chamber and the damping chamber being filled with a compressible gas. The movable piston may slidingly fit within the annular tube. The damping barrier may be connected to the annular tube and remote from the movable piston. The compression chamber may be on one side of the damping barrier and a damping chamber may be on another side of the damping barrier. The first valve may be operatively between the compression chamber and the damping chamber. The first valve may permit the compressible gas to flow between the compression chamber and the damping chamber. The first valve may include a first bias at least partially contributing to an effective force applied to a blocker. The effective force may be capable of being overcome by a threshold level of force of compressed gas in the compression chamber.

The suspension unit may further include a second valve operatively between the compression chamber and the damping chamber. The second valve may permit the compressible gas to flow between the damping chamber and the compression chamber. The second valve may include a second bias capable of being overcome by a threshold level of force of compressed gas in the damping chamber. The second valve may include a shim. The second bias may include a second spring urging the shim into a closed position.

The damping barrier may be connected to the first annular tube in a substantially fixed position. The damping barrier may be located substantially within the annular tube. The damping barrier may be connected to the first annular tube using a shaft that is annular along at least a portion of its length. The damping barrier and the shaft may at least partially define a serpentine pathway.

The first valve may be placed adjacent at least one of the barrier and the shaft. The first valve may further include a first blocker. The first bias may further include a first spring positioned adjacent the first blocker. The first bias may include a first blocker formed at least in part from a resilient material. The first blocker may include a pin. The first blocker may include a ball. The suspension unit may further include an adjuster operatively connected to the first blocker and capable of adjusting an effective spring force of the resilient material.

In another embodiment, a suspension unit for a bicycle includes an annular tube, a piston, a barrier assembly, a first valve, and an adjuster. The annular tube may define a compression chamber. The piston may slidingly interfit with the annular tube and may be capable of reciprocating with respect to the annular tube. The piston may be capable of compressing a compressible gas in the compression chamber. The barrier assembly may be remote from the piston and near one end of the annular tube. The compression chamber may be on one side of the barrier assembly and a damping chamber may be on another side of the barrier assembly. The first valve may be operatively between the compression chamber and the damping chamber. The first valve may be capable of permitting the compressible gas to flow between the compression chamber and the damping chamber. The adjuster may be operatively connected to the first valve and may have at least three positions.

The suspension unit may further include a second valve operatively between the compression chamber and the damping chamber. The second valve may be capable of permitting the compressible gas to flow between the damping chamber and the compression chamber. The first valve may include a bias. The adjuster may be capable of adjusting an effective spring force of the bias. The bias may be a spring. The adjuster may be capable of adjusting an effective spring force of the spring. The bias may be a resilient material from which at least a portion of the first valve is formed. The adjuster may be capable of adjusting an effective spring force of the resilient material. The adjuster may be substantially infinitely adjustable between a first extreme position and a second extreme position.

The first valve may include a blocker adjustable by the adjuster between a first position relatively substantially allowing the flow of compressed gas from the compression chamber to the damping chamber, a second position relatively substantially restricting the flow of compressed gas from the compression chamber to the damping chamber, and a third position between the first position and the second position relatively partially restricting the flow of compressed gas from the compression chamber to the damping chamber. The first bias may be adjustable by the adjuster between a first position relatively substantially allowing the flow of compressed gas from the compression chamber to the damping chamber, a second position relatively substantially restricting the flow of compressed gas from the compression chamber to the damping chamber, and a third position between the first position and the second position relatively partially restricting the flow of compressed gas from the compression chamber to the damping chamber. A portion of the first valve may be adjustable by the adjuster between a first position relatively substantially allowing the flow of compressed gas from the compression chamber to the damping chamber, a second position relatively substantially restricting the flow of compressed gas from the compression chamber to the damping chamber, and a third position between the first position and the second position relatively partially restricting the flow of compressed gas from the compression chamber to the damping chamber.

In another embodiment, the suspension unit for a bicycle includes an annular tube, a piston, a barrier assembly, a first valve, and a first passageway. The annular tube may define a compression chamber. The piston may slidingly interfit with the first annular tube and may be capable of reciprocating with respect to the annular tube. The piston may be capable of compressing a compressible gas in the compression chamber. The barrier assembly may be remote from the piston. The barrier assembly may include a damping barrier near one end of the annular tube. The compression chamber may be on one side of the barrier assembly and a damping chamber may be on another side of the barrier assembly. The first valve may be operatively between the compression chamber and the damping chamber. The first valve may be capable of permitting compressible gas to flow between the compression chamber and the damping chamber. The first passageway may be defined between the damping chamber and the compression chamber. Pressure from the compressible gas in the compression chamber may be capable of variably opening the first valve, thereby changing an effective size of the first passageway.

The suspension unit may further include a second valve operatively between the compression chamber and the damping chamber. The second valve may be capable of permitting the compressible gas to flow between the damping chamber and the compression chamber.

The first valve may further include a first bias. The first valve may further include a first blocker. An effective spring force applied by the first bias to the first blocker may at least partially define a threshold level of force in the compression chamber capable of opening the first valve. The first bias may be a spring. The first valve may include a first blocker comprising a resilient material, wherein an effective spring force applied by the first blocker at least partially defines a threshold level of force in the compression chamber capable of opening the first valve. An adjuster may be operatively connected to the first valve and may be capable of adjusting the variability of opening of the first passageway. The first passageway may be serpentine. The barrier assembly may be located substantially within the annular tube.

BRIEF DESCRIPTION OF THE SEVERAL VIEWS OF THE DRAWINGS

FIG. 8 is a detailed view of an alternative embodiment of the area marked 3-3 in FIG. 2;

FIG. 9 is a detailed view of another alternative embodiment of the area marked 3-3 in FIG. 2;

Figure 1:
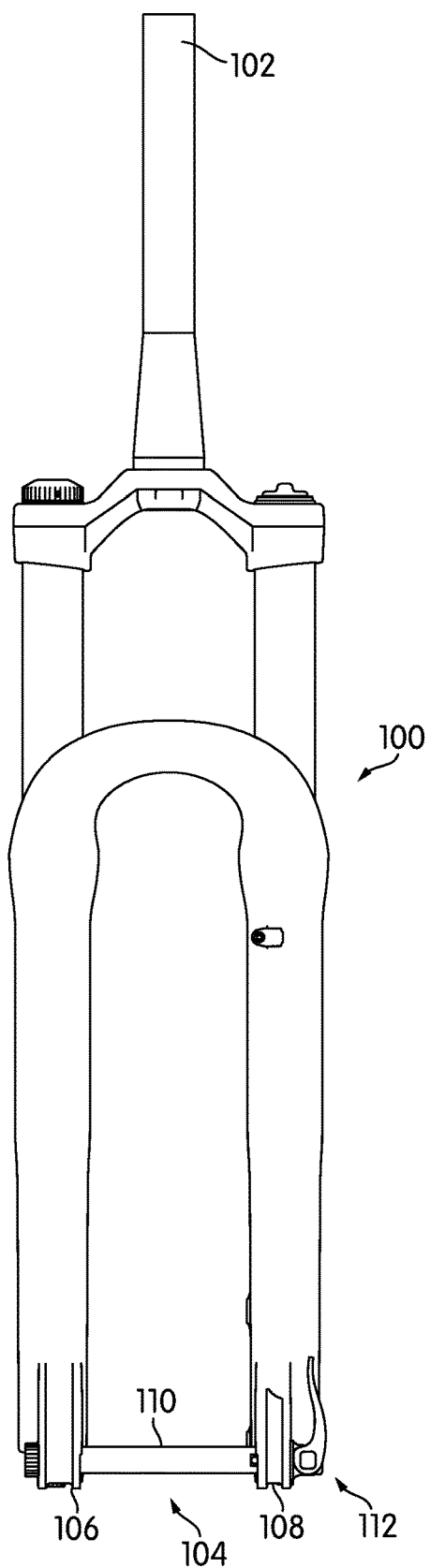
FIG. 1 is an exterior side view of a front fork of a bicycle according to the disclosed embodiments.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The present application claims priority to U.S. Provisional Patent Application Ser. No. 61/974,469, the disclosure of which is incorporated herein by reference.

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

In the present disclosure, the suspension structure may be described as it relates to a bicycle. However, the suspension structure described in the present embodiments may instead be applied to other vehicles. The present suspension structure may be used with vehicles having a different number of wheels, for example. The suspension structure may be used in connection with a motorized vehicle.

The present disclosure describes a suspension system that is filled with a compressible gas. The compressible gas may be injected into the suspension system in a known manner using conventional structure and technology. In the descriptions herein, it will be understood by a person having ordinary skill in the art that the pressure within the suspension unit at the beginning of a suspension stroke may be substantially in equilibrium throughout the suspension system. A user may select from a variety of pressures within the suspension unit, depending on the user's preferences regarding ride and handling and the demands of a particular course the rider desires to ride. These factors are all well-known in the art and are not described in detail herein.

In each of the embodiments described herein, there is described a first valve operatively positioned between and opening a first passageway between a compression chamber and a damping chamber. The first valve may be designed to open upon an increase in pressure in the compression chamber, such that there is a pressure difference between the pressure in the compression chamber and pressure in the damping chamber. For each embodiment, a threshold level of force of compressed gas in the compression chamber is capable of opening the first valve. This threshold level of force may primarily be governed by the design of the first valve. When the threshold level of force is present in the compression chamber, the valve may open to at least some degree. When the first valve includes a bias, the degree of opening of the valve and the effective size of the first passageway may be governed at least in part by the relative force on a blocker applied by the compressed gas in the compression chamber and the force of the bias on the blocker.

It is to be appreciated by a person having ordinary skill in the art that many of the described embodiments include a first valve designed to govern variable gas flow from the compression chamber to the damping chamber and a second valve designed to govern variable gas flow from the damping chamber to the compression chamber. However, in a real world application of the device, some counter gas flow may be expected. Such counter flow will not be described in detail in each embodiment. In addition, in areas of the specification where directional gas flow may be described, such flow should not be considered to be exclusive and without the possibility of counter flow. Instead, a person having ordinary skill in the art will understand that flow in other directions is possible and expected. In many of the embodiments, the first and second valves may be designed to be check valves, which optimally allow fluid flow in only one direction and close immediately upon pressure equalization.

The structures described herein may be applied to either a front or rear suspension of a vehicle, most particularly a bicycle. The remaining structures present in the suspension may be illustrated and may be described in at least a cursory fashion. However, these structures are not critical to the use of the embodiments described herein. The present embodiments could be incorporated with other suspensions that use a compressible gas. Accordingly, the suspension system elements shown should not be construed as being limiting to the embodiments described.

Some embodiments are shown as being applied in the context of a front suspension and others in a rear suspension. In general, persons of ordinary skill in the art are familiar with the structural and functional differences and limitations between shock absorbers and can make the necessary modifications to use the structures described herein in context. However, a person of ordinary skill in the art is able to understand that any of the disclosed embodiments could, in theory, be used in another suspension system in current operation or later developed.

FIG. 1 illustrates a suspension system 100 for a vehicle (not shown). The embodiments shown are illustrated in the context of a bicycle. However, the designs could be modified for use with a vehicle having more than two wheels or a vehicle powered by a motor. The top end 102 of the suspension system may be attached to handle bars or another steering system (not shown), manipulable by a rider to set and change the direction of the vehicle. The bottom end 104 of the suspension system 100 may include a first bracket 106 and a second bracket 108 that are configured to allow an axle 110 to be passed therethrough. The first bracket 106 and the second bracket 108 may be any conventional open bore or closed bore bracket as desired by the designer. The axle 110 shown includes a quick release 112. The use of such a quick release 112 is optional and any mechanism for fixing the axle in place may be substituted therefore. In operation, a hub and wheel (not shown) may be mounted in surrounding fashion to the axle 110.

Figure 2:
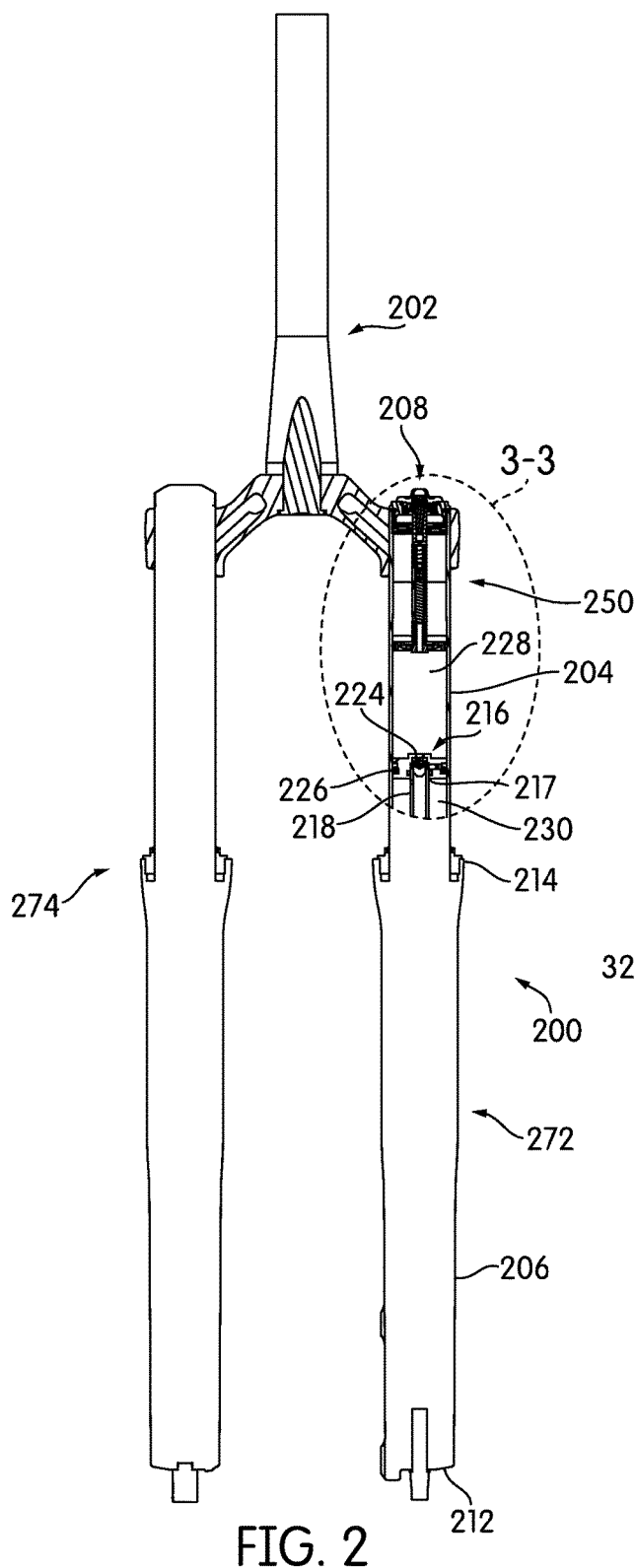
FIG. 2 is a partial cross-sectional view of FIG. 1 showing a first embodiment of the damping structure.

Turning now to FIG. 2, the position of the damping structure for the suspension system is shown. The suspension system 200 of the present embodiments is shown as being in a single side of the fork 202. In another embodiment, it may be desirable to incorporate the damped suspension system in the other side of the fork 202 or to incorporate it in both sides of the fork 202. In still other embodiments, a fork with only a single arm may be used, and the suspension system 200 may be incorporated therein. A designer is able to make such adjustments without undue experimentation.

The fork shown in FIG. 2 has a first leg 272 and a second leg 274. Each leg 272, 274 may incorporate a conventional structure and method for absorbing force imparted to the frame (not shown) from impact between the wheel (not shown) and other objects, including the weight of the rider. Such structures are well-known by persons of ordinary skill in the art. These structures are merely exemplary. Other structures currently known or developed in the future could be substituted therefor by a person of ordinary skill in the art without undue experimentation.

The suspension system 200 may include a first annular tube 204 and a second annular tube 206. The first annular tube 204 may have a closed end 208 at the top of the fork and an opposing open end (not shown). The second annular tube 206 may have a closed end 212 at the bottom of the fork and an opposing open end 214. In the embodiment shown, the open end of the first annular tube 204 may be configured to telescopically slide or interfit into the open end 214 of the second annular tube 206. In other embodiments, it may be desirable for the open end 214 of the second annular tube 206 to fit within the open end of the first annular tube 204. Such design choices are within the knowledge and skill of a designer in the art. Regardless of the precise configuration, the first annular tube 204 and second annular tube 206 may be configured to slidingly and telescopically interfit with one another. The space defined within the first annular tube 204 and the second annular tube 206 may be at least partially filled with one or more compressed gases, as will be described in greater detail below. In many configurations, the first annular tube 204 and the second annular tube 206 are substantially round in cross-sectional configuration.

A movable piston assembly 216 may be attached to the second annular tube 206. In the embodiment shown, the movable piston assembly 216 may be attached to one end 217 of an annular shaft 218. A second, opposing end (not shown) of the annular shaft 218 may be attached to the second annular tube 206. In the configuration shown in FIG. 2, the second end may be attached adjacent the closed end 212 of the second annular tube 206. Such a configuration is not required, but in many embodiments it may be an efficient design. The length of the annular shaft 218 may be determined based on the length, circumference, and volume of the first annular tube 204 and the second annular tube 206 based on conventional calculations.

The movable piston assembly 216 may include a movable piston 224 and an optional seal 226. The movable piston assembly 216 may be designed to prevent or minimize the passage of compressed gas between the compression chamber 228 and a lower chamber 230. In many embodiments, because the movable piston 224 is configured to move, it may be desirable for the movable piston 224 to have a smaller diameter than the diameter of the first annular tube 204. The seal 226 may be configured to bridge the distance between the diameter of the movable piston 224 and the diameter of the first annular tube 204. Such a seal 226 is conventional and may be selected by a person having ordinary skill in the art in a known manner based, at least in part, on manufacturing tolerances, size, and the desired pressure of the pressurized gas within the first annular tube 204 and the second annular tube 206. The piston assembly 216, shaft 218, and much of the remainder of the suspension system are merely shown and described generally and schematically. Other suspension structures could be easily substituted therefor.

A damper 250 may be incorporated near the closed end 208 of the first annular tube 204. One exemplary embodiment of a damper 250 is illustrated in FIG. 2. The damper 250 may be inserted and secured in the closed end 208 of the first annular tube 204 by corresponding threaded connections. Various embodiments of a damper that could be incorporated into a suspension system may be seen in FIGS. 3-14. Any of these structures could be substituted for the damper 250 illustrated in FIG. 2.

Figure 3:
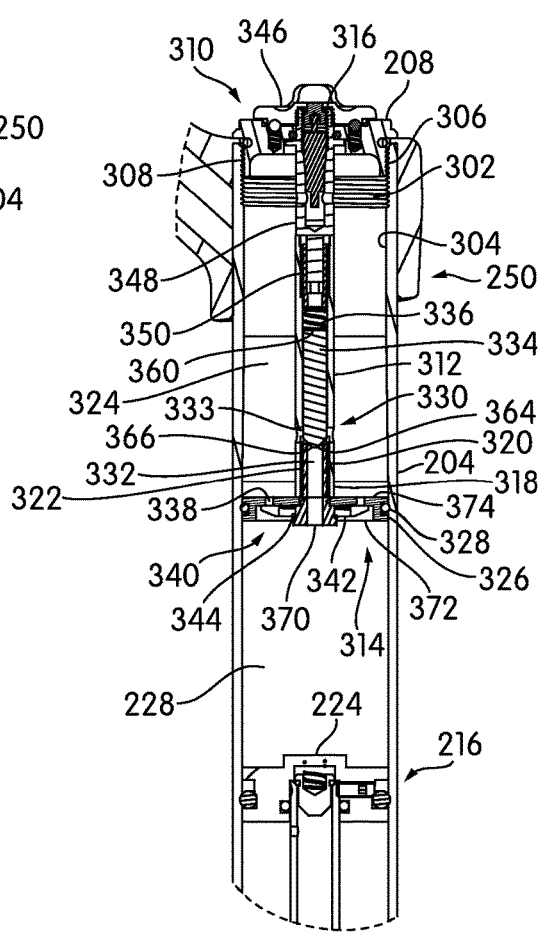
FIG. 3 is a detailed view of one embodiment of the area marked 3-3 in FIG. 2 with an adjuster in an intermediate position.

Turning now to the embodiment of FIG. 3, one embodiment of a damper 250 is illustrated in greater detail. The first annular tube 204 may define a compression chamber 228 and a damping chamber 324. The piston 224 may slidingly interfit with the first annular tube 204 and may be capable of compressing a compressible gas in the compression chamber 228.

The damper 250 may be incorporated into the first annular tube 204. A thread 302 may be incorporated on an inner surface 304 of the first annular tube 204. A corresponding thread 306 may be incorporated onto an exterior surface 308 of the head 310 of the damper 250. When the damper 250 is assembled with the first annular tube 204, the head 310 of the damper 250 may form the closed end 208 of the first annular tube 204. A first end 316 of a shaft 312 may thereby be attached or connected to and extend from the closed end 208 of the first annular tube 204. The shaft 312 may be annular along at least a portion of its length. A barrier assembly 314 may be attached to a second end 318 of the shaft 312. In some embodiments, the shaft 312 may include a first corresponding thread 320 and the barrier assembly 314 may include a second corresponding thread 322. The first corresponding thread 320 and the second corresponding thread 322 may be configured to mate with one another to allow the attachment of the barrier assembly 314 to the shaft 312. The barrier assembly 314 may at least partially define a boundary between the compression chamber 228 and the damping chamber 324. The compression chamber 228 may be on one side 372 of the barrier assembly 314 and the damping chamber 324 may be on another, opposite side 374 of the barrier assembly 314. In many embodiments, the damper 250 may be positioned within the first annular tube 204 remote from the movable piston assembly 216. In many embodiments, the barrier assembly 314 may be positioned near the first end 208 of the first annular tube 204.

In some embodiments, the barrier assembly 314 may include a damping barrier 326 and a damping seal 328. The barrier assembly 326 may be designed to restrict or control the passage of compressed gas between the compression chamber 228 and the damping chamber 324. In many embodiments, because the damping barrier 326 may be configured to remain substantially stationary within the first annular tube 204, the damping seal 328 may be unnecessary and the damping barrier 326 may be designed to interfit with the first annular tube 204 with a tight tolerance. In other embodiments, it may be desirable for the damping barrier 326 to have a smaller diameter than the diameter of the first annular tube 204. The damping seal 328 may be configured to bridge the distance between the diameter of the damping barrier 326 and the diameter of the first annular tube 204. Such a damping seal 328 is conventional and may be selected by a person having ordinary skill in the art in a known manner based, at least in part, on manufacturing tolerances, size, and the desired pressure of the pressurized gas within the first annular tube 204 and the second annular tube 206.

The damper 250 may include a first valve 330 and a second valve 340. The first valve 330 may be positioned operatively between and may selectively permit compressed gas to flow from the compression chamber 228 to the damping chamber 324. The second valve 340 may be positioned operatively between and may selectively permit compressed gas to flow from the damping chamber 324 to the compression chamber 228.

In the embodiment of FIG. 3, the first valve 330 may include a first passageway 332 that allows the passage of gas between the compression chamber 228 and the damping chamber 324. The first passageway 332 may be serpentine. The first passageway 332 may include a plurality of apertures 333 defined within the shaft 312. In other embodiments, the first passageway 332 may include a single aperture defined within the shaft 312. In many embodiments, the first passageway 332 may also include one or more apertures 370 through the barrier assembly 314. In the configuration illustrated in FIG. 3, the first passageway 332 may be configured to allow compressed gas to flow from the compression chamber 228 through the aperture 370 in the damping barrier, continue through the shaft 312, and exit through at least one aperture 333 in the shaft 312. A first blocker 334 may be positioned adjacent to or within the first passageway 332. In the embodiment shown in FIG. 3, the first blocker 334 may be a pin. A first bias, such as the spring 336, may be positioned adjacent the first blocker 334. In many embodiments, the first bias 336 may be a coil spring. In other embodiments, it may be a leaf spring or a resilient elastomer. Other biasing elements may also be used, if desired by a designer. In many embodiments, the first bias 336 may be configured to bias or urge the first blocker 334 into a closed position. The first bias 336 may press against a first end 360 of the blocker 334. A second, opposite end 366 of the blocker may impinge on a lip or edge 364 within the shaft 312. This configuration may allow the first bias 336 to hold the first blocker 334 in a maximally restrictive position.

The first blocker 334 may be acted upon by a variety of forces. First, the first blocker 334 may be acted upon by gravity to move or retain the first blocker 334 in the lowest possible position. Next, depending on the position of the first bias 336 and the adjuster 346 (as will be described in greater detail below), the first bias 336 may also exert a force on the first blocker 334 urging it to its lowest possible position. In many embodiments, the cumulative pressure or force of the compressed gas in the compression chamber 228, damping chamber 324, and in other areas of the suspension unit may exert a downward force on the first blocker 334. These forces may combine to form an effective force applied to the first blocker 334. In many embodiments, the lowest possible position of the first blocker 334 may represent a closed position of the first valve 330, as shown in FIG. 3.

In use, a rider is likely to ride the vehicle over areas of terrain with a variety of obstacles. When a rider encounters an obstacle, the suspension unit 202 may be configured to absorb at least some of the force of the impact. In such an instance, the movable piston assembly 216 may move upwardly within the first annular tube 204. This movement may serve to compress the compressible gas within the compression chamber 228. In some instances, the force of the compressible gas in the compression chamber 228 may function as in a conventional suspension. However, in other instances, the compression of the compressible gas may actuate the damper 250 to damp the compression and reduce shock passing to the rider.

When the piston assembly 216 moves upward, it may compress the compressible gas in the compression chamber 228. This compression may create a pressure or force within the compression chamber 228. When the force in the compression chamber 228 exceeds a threshold level of force, this threshold level of force may overcome the effective force. The result of the threshold level of force overcoming the effective force is movement of the first blocker 334 upwardly, thereby opening the first valve 330 and permitting the compressible gas to flow between the compression chamber 228 and the damping chamber 324.

Pressure from the compressible gas in the compression chamber 228 may variably open the first valve 330. Because a portion of the effective force urging the first blocker 334 into a closed position may be applied by a spring, such as the spring 336, the effective force, particularly the effective spring force of the spring 336 may vary, based on the degree to which the blocker 334 is moved. This is due to well-known properties of springs. As the first blocker 334 is more greatly displaced upwardly, and the spring 336 is thereby compressed farther, proportionally more force is required to move the blocker 334 upward a greater distance. Accordingly, depending on the spring constant of the bias, varying amounts of force from the compressible gas in the compression chamber may cause varying degrees of opening of the first valve 330. Such choices may improve a rider's feel, by damping the compression of the suspension unit, particularly upon the application of a sharp force to the suspension unit. By selecting an appropriate bias 336 and an appropriate size of the passageway 332, particularly the holes 333, a person having ordinary skill in the art may appropriately tune the first valve 330 to open to varying degrees at various thresholds of force. Such design choices are within the scope of a designer of ordinary skill in the art.

Figure 4:
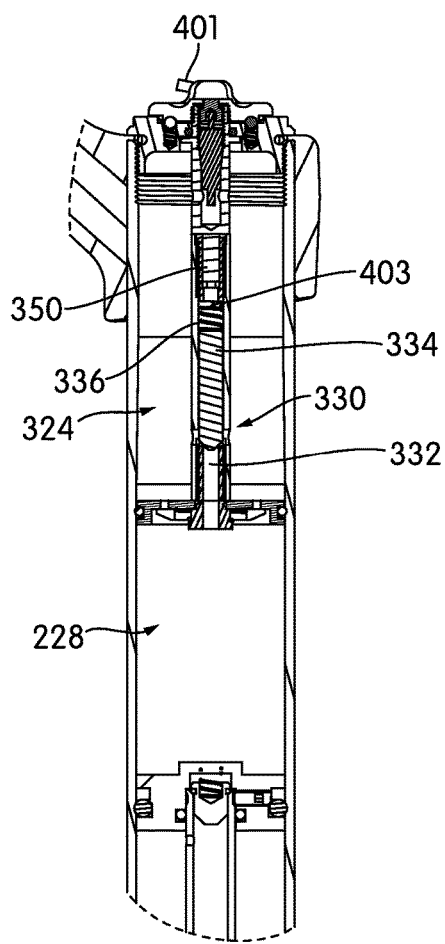
FIG. 4 is a detailed view of the embodiment of FIG. 3 with the adjuster in a first extreme position.

Further, in some embodiments, the first valve 330 may be configured to allow a user to adjust the damping properties of the damper 250, and more specifically, the first valve 330. The damper 250 may include an adjuster 346 that may be manipulable by a user from the exterior of the vehicle. In some embodiments, the adjuster 346 may be a knob. In other embodiments, the adjuster 346 may be a lever. The precise external configuration of the adjuster 346 is not critical to the function of the embodiments. The adjuster 346 may be configured to directly or indirectly interact with the first bias 336 to reduce the force exerted by the first bias 336 by changing the preload on the bias 336. How the adjuster 346 may perform this function may be seen by a comparison of FIGS. 3, 4, and 5. In the embodiment shown in FIG. 3, when the adjuster 346 is rotated, the upper portion 348 of the shaft 312 may also rotate. This rotation will cause longitudinal displacement in or out (depending on the direction of rotation) of a pin 350. When the pin 350 is displaced upwardly (in the orientation shown in FIG. 3), the first bias 336 is permitted to expand, reducing the preload of the first bias 336. Such a position is shown in FIG. 4 at a first extreme position 401 of the adjuster 346. In some embodiments, the adjuster may be configured to present a gap, such as the gap 403, between the pin 350 and the first bias 336. In such an embodiment, the threshold force in the compression chamber 228 to at least slightly open the passageway 332 and allow compressible gas to flow between the compression chamber 228 and the damping chamber 324 may be very low. As was the case in the intermediate adjuster position of FIG. 3, as the first blocker 334 is displaced upwardly, it may contact the first bias 336, thereby requiring additional increase in force in the compression chamber 228 for additional incremental increase in the displacement of the first blocker 334.

Figure 5:
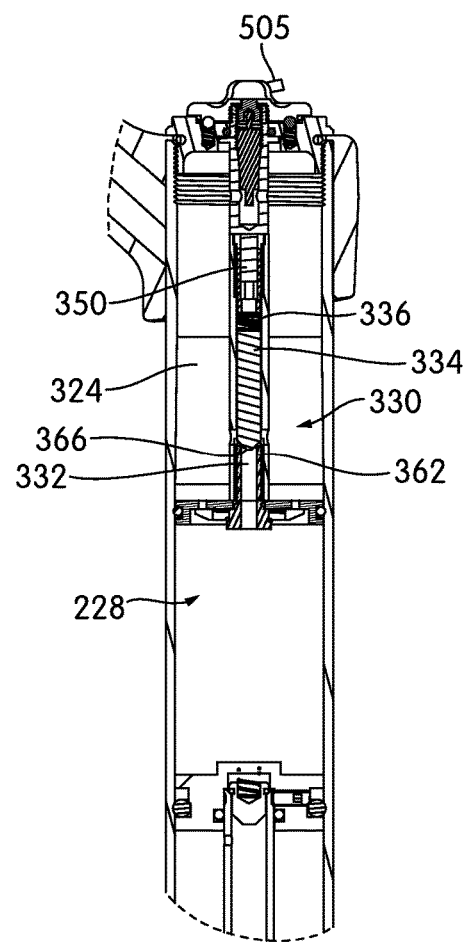
FIG. 5 is a detailed view of the embodiment of FIG. 3 with the adjuster in a second extreme position.

A second extreme position 505 of the adjuster 346 may be seen in FIG. 5. At this second extreme position, the pin 350 may be displaced downwardly (in the orientation shown in FIG. 4). In such a position, the first bias 336 is more greatly compressed relative to the intermediate position of the adjuster 346 as shown in FIG. 3, thereby increasing the preload of the first bias 336. The change of the spring preload of the first bias 336 may thereby change the pressure necessary to move the first blocker 334 and allow the passage of the compressed gas through the first passageway 332. In many embodiments, while it may be physically possible to increase the preload to prevent the blocker 334 from being able to be displaced and allow passage of compressed gas between the compression chamber 228 and the damping chamber 324, in most embodiments, such a configuration may be undesirable, as it would merely reduce the effective size of the compression chamber 228, which may have a negative effect on ride feel. Accordingly, it may be desirable in many embodiments to allow adjustment only to an extent that a rider can only maximally adjust the adjuster 346 to allow the opening of the first valve 330 in extreme forces.

In many of the embodiments shown, and as most clearly shown in the embodiments of FIGS. 3-5, the adjuster 346 may be adjustable between at least three positions. In a first extreme position, such as first extreme position 401, the preload on the first bias 336 may be minimized or eliminated, possibly even allowing for free movement of the first blocker 334 for some distance. That is, in some embodiments, the effective force may be only the force necessary to overcome the force of gravity on the first blocker 334. In such a first extreme position 401, the first valve 330 substantially allows the flow of compressed gas from the compression chamber 228 to the damping chamber 324, relative to the other positions of the adjuster 346. In a second extreme position, such as second extreme position 505, the preload on the first bias 336 may be increased. In such an embodiment, the free end 366 of the blocker 334 may be pressed against the lip 362. Once such impact is made, the preload on the first bias 336 may increase. In such a second extreme position 505, the first valve 330 substantially restricts the flow of compressed gas from the compression chamber 228 to the damping chamber 324, relative to the other positions of the adjuster 346. In a third, intermediate position, such as that shown in FIG. 3, the preload on the first bias 336 may be intermediate that of the two extreme positions. In such a third position, the first valve 330 partially restricts the flow of compressed gas from the compression chamber 228 to the damping chamber 324, relative to the extreme positions of the adjuster 346 described above.

Figures 6, 7:
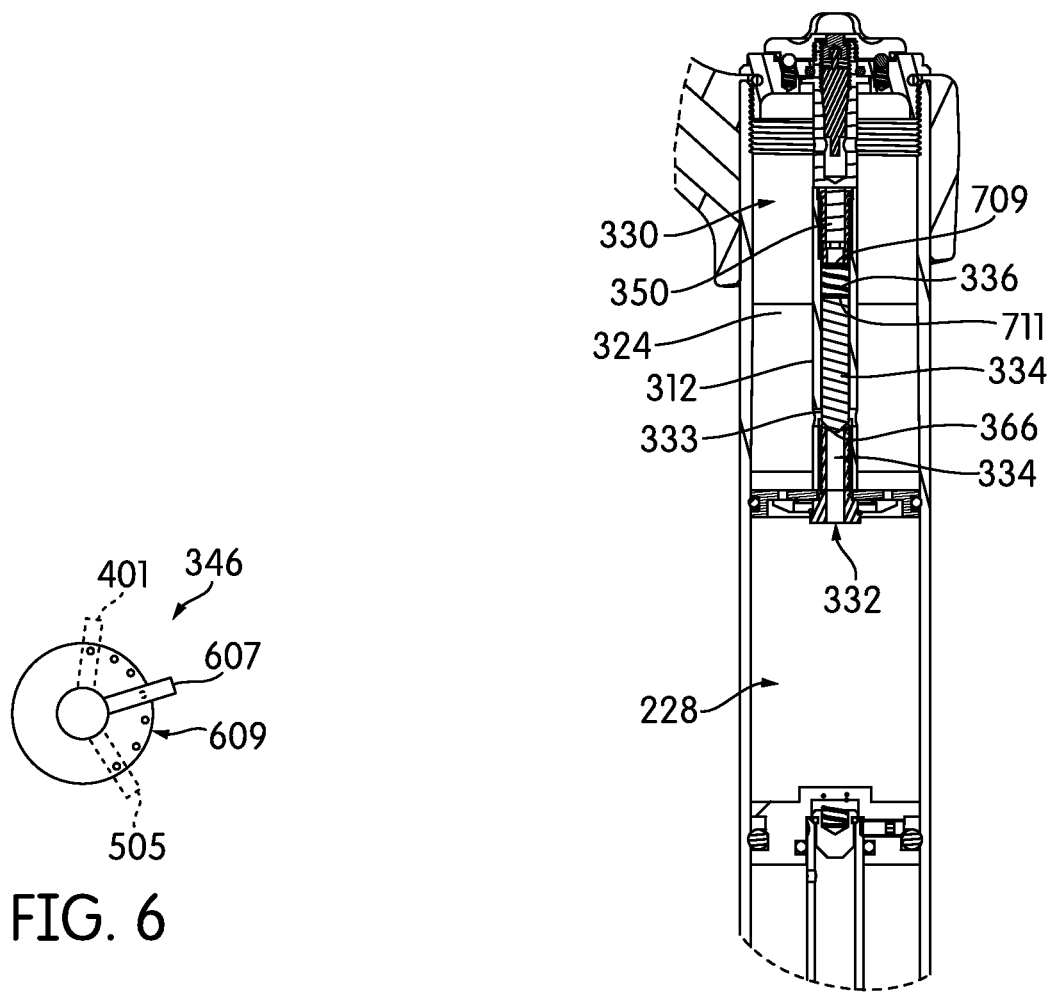
FIG. 6 is a top view of a representative adjuster according to the embodiment of FIG. 3.
FIG. 7 is a detailed view of an alternative adjustment embodiment to FIG. 3.

FIG. 6 illustrates a top view of one embodiment of an adjuster 346. In this exemplary embodiment, the adjuster 346 may include a lever 607 that is manipulable by a user. The position of the lever 607 as shown in FIG. 6 may be the intermediate position of the adjuster 346 as illustrated in FIG. 3. The first extreme position 401 and the second extreme position 505 are illustrated in dashed lines. In some embodiments, indicia, such as the dots 609 shown, may be used to assist a user in understanding the range of possible adjustment. In many embodiments, the adjuster 346 may be infinitely adjustable between the first extreme position 401 and the second extreme position 505. In other embodiments, the adjuster may be restricted to only certain intermediate positions, such as those shown as dots 609 in FIG. 6. A person having ordinary skill in the art may select an appropriate structure and method for allowing such adjustment. For many riders, having the maximum control over adjustments is desirable, so in many embodiments, a designer is likely to select an infinite adjustment range.

A further embodiment showing a different function of the adjuster may be seen in FIG. 7. In such an embodiment, the longitudinal displacement of the pin 350 may be used to adjust the position of the first blocker 334 within the passageway 332. In the embodiment illustrated in FIG. 7, the pin 350 may be secured to one end 709 of the first bias 336. The first blocker 334 may be secured to the other end 711 of the first bias 336. As the pin is displaced upwardly, the upward spring force on the blocker 334 from the first bias 336 may move the blocker 334 within the passageway 332, and relative to the openings 333 in the shaft 312. As will be understood by a person having ordinary skill in the art, adjusting the position of the free end 366 relative to the openings 333 and the lip 362 without the free end 366 making contact with the lip 362 may change the threshold amount of force in the compression chamber necessary to variably open the first valve 330. Other structures are available to adjust the position of the first blocker 334 integrally with the first bias 336, and such structures are well known to designers. The version shown in FIG. 7 is merely illustrative of one simplified possible structure.

In the embodiments that follow, it will be understood by a person having ordinary skill in the art that the effective force on the respective biases may be adjusted in a manner similar to that shown in FIGS. 3-6. When the use of an adjuster is mentioned, it will be understood that the adjuster may be used in a similar manner. In embodiments where it is meaningful, a free end of a blocker may be adjustable within the passageway. In embodiments where it is meaningful, a preload of a bias may be reduced or increased. The illustrated embodiments will be understood by a person having ordinary skill in the art to show an intermediate position of the adjuster. Such a designer will be able to configure each additional embodiment to allow for a range of effective forces to allow the variable opening of the passageway to allow compressible gas between the compression chamber and the damping chamber without undue experimentation.

Returning to the embodiment of FIG. 3, the damper 250 may further include a second valve. The second valve 340 may include a second passageway 338 that allows the passage of gas between the compression chamber 228 and the damping chamber 324. The second passageway 338 may be a plurality of apertures defined within the damping barrier 326. In other embodiments, the second passageway 338 may be a single aperture defined within the damping barrier 326. In other embodiments, the second passageway 338 may be defined within the shaft 312. A second blocker 342 may be positioned adjacent the second passageway 338 and may be configured to selectively open and close to restrict or control the flow of compressed gas from the damping chamber 324 to the compression chamber 228. In the embodiment shown in FIG. 3, the second blocker 342 may be a shim, and in particular may be a flexible shim. If a flexible shim is used, the flexible shim may function as an additional bias, due to its ability to deform under pressure. If such a shim is used, a person having ordinary skill in the art will understand that when the second bias is described herein, it will be understood to incorporate the properties of the shim therein. A second bias, such as the spring 344, may be positioned adjacent the second blocker 342 to define the properties under which the second blocker 342 may move to its open position. In many embodiments, the second bias 344 may be a coil spring. In other embodiments, it may be a leaf spring or a resilient elastomer. Other biasing elements may also be used, if desired by a designer. In many embodiments, the second bias 344 may be configured to bias or urge the second blocker 342 into a closed position.

The embodiments of FIGS. 8-14 share many elements in common with the embodiments of FIG. 3. The function of the embodiments is substantially the same. Many of the structural elements are substantially the same as those in FIG. 3. Only where there is a difference is the difference described. In addition, most of the design changes between the configurations can be mixed and matched. For example, the design of the first valve in the embodiment of FIG. 3 could be substituted into the configuration of many of the other FIGS. without making any other substitutions. A person having ordinary skill in the art will be able to make such changes without undue experimentation.

The differences between the damper of FIG. 3 and that of FIGS. 8-14 may be seen most clearly in the detailed view of FIG. 8. In the damper 800, there are changes to both the first valve 802 and the second valve 804. In the first valve 802, the blocker may be a ball 806. Upward displacement of the ball 806 functions in a manner similar to the blocker 334 to allow compressed gas to pass between the compression chamber 828 and the damping chamber 830 through the first passageway 808. The first valve 802 or portions thereof may be adjustable by the adjuster 810.

The embodiment of FIG. 8 also includes changes to the second valve 804. In the FIG. 8 embodiment, the second blocker 816 may be an elastomeric or compressible o-ring trapped by a retaining ring 818 forming a lip. In such an embodiment, the second blocker 816 also functions as a bias. Pressure from the compressed gas within the damping chamber 830 may compress the second blocker 816 and move it away from the second passageway 820. This compression may allow the passage of the compressed gas through the second passageway 820 and around the second blocker 816 into the compression chamber 828. When sufficient gas has been released from the damping chamber 830, the internal biasing of the second blocker 816 may force the second blocker 816 into a sealing relationship to the second passageway 820, thereby substantially preventing the flow of the compressed gas between the damping chamber 830 and the compression chamber 828.

Turning now to the embodiment of FIG. 9, the damper 900 includes a different combination of features to form the first damping valve 902 and the second damping valve 904. The first damping valve 902 is substantially the same as that disclosed as the first damping valve 802 of FIG. 8. The second damping valve 904 is substantially the same as that disclosed as the second damping valve 340 shown in FIG. 3. This embodiment demonstrates, among other things, that various elements from the different embodiments may be combined differently to form equally functional shock absorbers. The first valve 902 or portions thereof may be adjustable by the adjuster 906.

Figure 10:
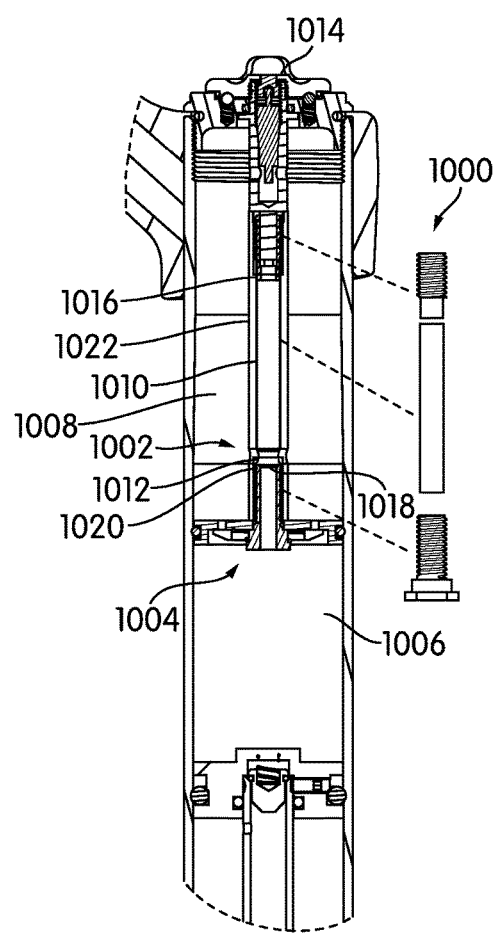
FIG. 10 is a detailed view of yet another alternative embodiment of the area marked 3-3 in FIG. 2.

Turning now to FIG. 10, the damper 1000 may include a first valve 1002 and a second valve 1004 that allow gas to pass between the compression chamber 1006 and the damping chamber 1008. The second valve 1004 may be substantially the same as that described in the embodiments of FIG. 3 or FIG. 9, and accordingly a description of the second valve 1004 will not be repeated here.

However, the first valve 1002 shows a first blocker 1010 that is self-biasing. In the FIG. 10 embodiment, the first blocker 1010 may be an elastomeric or compressible pin made of a resilient material. In such an embodiment, the first blocker 1010 may also function as a bias. Pressure from the compressed gas within the compression chamber 1006 may compress and/or move the first blocker 1010 upwardly within the first passageway 1012. This compression may allow the passage of the compressed gas through the first passageway 1012 between the compression chamber 1006 and the damping chamber 1008. When sufficient gas has been released from the compression chamber 1006, the internal biasing of the first blocker 1010 may return the first blocker 1010 into its initial position, thereby substantially restricting or preventing the flow of the compressed gas from the compression chamber 1006 to the damping chamber 1008.

In the embodiment of FIG. 10, the adjuster 1014 may be configured to seat and press directly against a first end 1016 of the self-biasing blocker 1010. The adjuster 1014 may be configured to increase or decrease the pressure between the opposite, second end 1018 of the self-biasing blocker 1010 against the lip or edge 1020 on the interior of the shaft 1022. This increase and decrease in pressure may vary preload of the self-biasing blocker 1010, thereby adjusting the damping of the suspension unit. The adjuster 1014 may also, or alternatively, be capable of adjusting the position of the second end 1018 relative to the lip 1020, such that the second end 1018 of the blocker 1010 is spaced from the lip 1020. This adjustment of the self-biasing blocker 1010 is the same in principle to that illustrated and described above. This substitution is apparent to a person having ordinary skill in the art.

Figure 11:
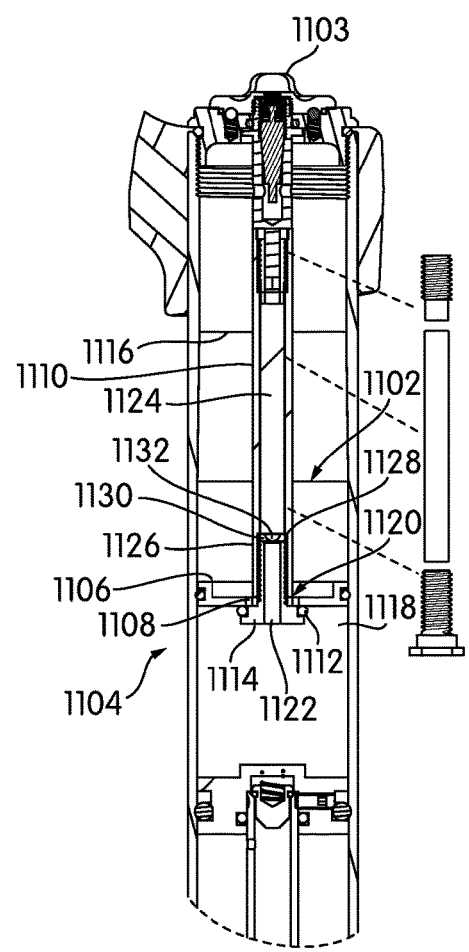
FIG. 11 is a detailed view of yet another alternative embodiment of the area marked 3-3 in FIG. 2.

Turning now to the embodiment of FIG. 11, the first valve 1102 and the adjuster 1103 are substantially identical to the embodiment of FIG. 10, and thus the first valve 1102 will not be described further. The second valve 1104 is similar in principle to that illustrated as second valve 804 in FIG. 8. However, in the embodiment of FIG. 11, the construction of the barrier assembly 1106 is simplified to allow for the incorporation of the second valve 1104. The central bore 1108 of the barrier assembly 1106 may be enlarged to allow passage of the shaft 1110 with a gap 1120 between the shaft 1110 and the bore 1108. An o-ring 1112 may be positioned against a flange 1114 on a threaded bolt securing the barrier assembly 1106 in position on the shaft 1110. When the pressure in the damping chamber 1116 exceeds that in the compression chamber 1118, compressible gas may flow into the gap 1120 between the shaft 1110 and the bore 1108. The pressure from the compressible gas may compress the o-ring 1112, thereby opening the second valve 1104 and permitting compressible gas to flow between the damping chamber 1116 and the compression chamber 1118.

The use of the adjuster in connection with a resilient blocker may be apparent when a comparison is made between FIG. 10 and FIG. 11. As may be seen in FIG. 11, the adjuster 1103 may be positioned in a first extreme position. In such a position, the adjuster 1103 may be moved to displace the resilient blocker 1124 upwardly, creating a gap 1130 between a lower end 1126 of the blocker 1124 and the lip 1128. In some embodiments, the lip 1128 may be spaced from the apertures 1132 defined within the shaft 1110, thereby allowing for a gap 1130 between the lip 1128 and the lower end 1126 of the blocker 1124. In some embodiments, such as the one illustrated in FIG. 11, the adjuster 1103 may be configured to position the blocker 1124 such that the aperture 1132 is at least partially open, allowing for some flow of compressed gas between the compression chamber 1118 and the damping chamber 1116. This may represent a first extreme position of the adjuster 1104. In many embodiments, it may be desirable for the first extreme position to only allow for a comparatively small opening of the aperture 1132 and therefore passageway 1122. In such a configuration, an increase in pressure in the compression chamber 1118 may compress the resilient blocker 1124, thereby moving the lower end 1126 of the blocker 1124 upwardly, thereby variably increasing the size of the passageway 1122 based on the pressure in the compression chamber 1118 and the pressure difference between the compressible gas in the compression chamber 1118 relative to the damping chamber 1116.

Looking now at the embodiment of FIG. 10, the adjuster 1014 may be in a second extreme position or an intermediate position. Which position it is in would be difficult to discern from this view. In a second extreme position, the adjuster 1014 would be turned so that the lower end 1018 of the blocker 1010 is pressed against the lip 1020 to a designated maximum degree. The compression of the resilient blocker 1010 may increase the effective spring force of the first valve 1002. In this second extreme position, only when the force in the compression chamber 1006 rises a great deal is the resilient blocker 1010 likely to further compress and open the passageway 1012. In an intermediate position of the adjuster 1014, the lower end 1018 may just touch the lip 1020, thereby requiring some increase in force of the compressed gas in the compression chamber 1006 to compress the resilient blocker 1010, causing the lower end 1018 to move upwardly and open the passageway 1012.

Accordingly, the embodiments of FIGS. 10 and 11 are, in this way, similar to the embodiment shown in FIGS. 3-5. The adjuster 1014, 1103 may be adjustable between at least three positions. In a first extreme position, the preload on the first blocker 1010, 1124 may be minimized or eliminated, possibly even allowing the passageway 1012, 1122 to remain partially open. In such a first extreme position, the first valve 1002, 1102 substantially allows the flow of compressed gas from the compression chamber 1006, 1118 to the damping chamber 1008, 1116, relative to the other positions of the adjuster 1014, 1103. In a second extreme position, the preload on the first blocker 1010, 1124 may be increased. In such an embodiment, the free end 1018, 1126 of the first blocker 1010, 1124 may be pressed against the lip 1020, 1128. Once such impact is made, the preload on the first blocker 1010, 1124 may increase. In such a second extreme position, the first valve 1002, 1102 may substantially restrict the flow of compressed gas from the compression chamber 1106, 1118 to the damping chamber 1008, 1116, relative to the other positions of the adjuster 1014, 1103. In a third intermediate position, the preload on the first blocker 1010, 1124 may be intermediate that of the two extreme positions. In such a third position, the first valve 1002, 1102 may partially restrict the flow of compressed gas from the compression chamber 1106, 1118 to the damping chamber 1008, 1116, relative to the other positions of the adjuster 1014, 1103. The features of the adjuster 346, particularly as shown in FIG. 6, may also be used in this detailed embodiment. For example, the adjuster may be infinitely adjustable between the three described positions.

In addition, it will be apparent to a person having ordinary skill in the art that there are a variety of ways and structures that will allow for a similar adjustment function. For example, instead of moving the blocker or bias, the adjuster could be configured to adjust the shaft and the apertures therein relative to the blocker or bias. In another embodiment, the adjuster could be configured to adjust the position of the lip. In other embodiments, each of these features could be independently adjustable with its own adjuster. Further configurations having a similar result may be contemplated by a person having ordinary skill in the art and may fall within the scope of the present disclosure. In such configurations, in addition to the embodiments described in greater detail above, the adjuster may adjust one or more parts of the valve and may be considered to "adjust the valve" to allow for a variety of air passage results. In each embodiment, such an adjuster may be adjustable between at least three positions. In a first extreme position, the adjuster may adjust the first valve to substantially allow the flow of compressed gas from the compression chamber to the damping chamber, relative to the other positions of the adjuster. In a second extreme position, the first valve may substantially restrict the flow of compressed gas from the compression chamber to the damping chamber, relative to the other positions of the adjuster. In a third intermediate position, the preload on the first blocker may be intermediate that of the two extreme positions. In such a third position, the first valve may partially restrict the flow of compressed gas from the compression chamber to the damping chamber, relative to the other positions of the adjuster. As noted above, the adjuster may be infinitely adjustable between these three positions.

Figure 12:
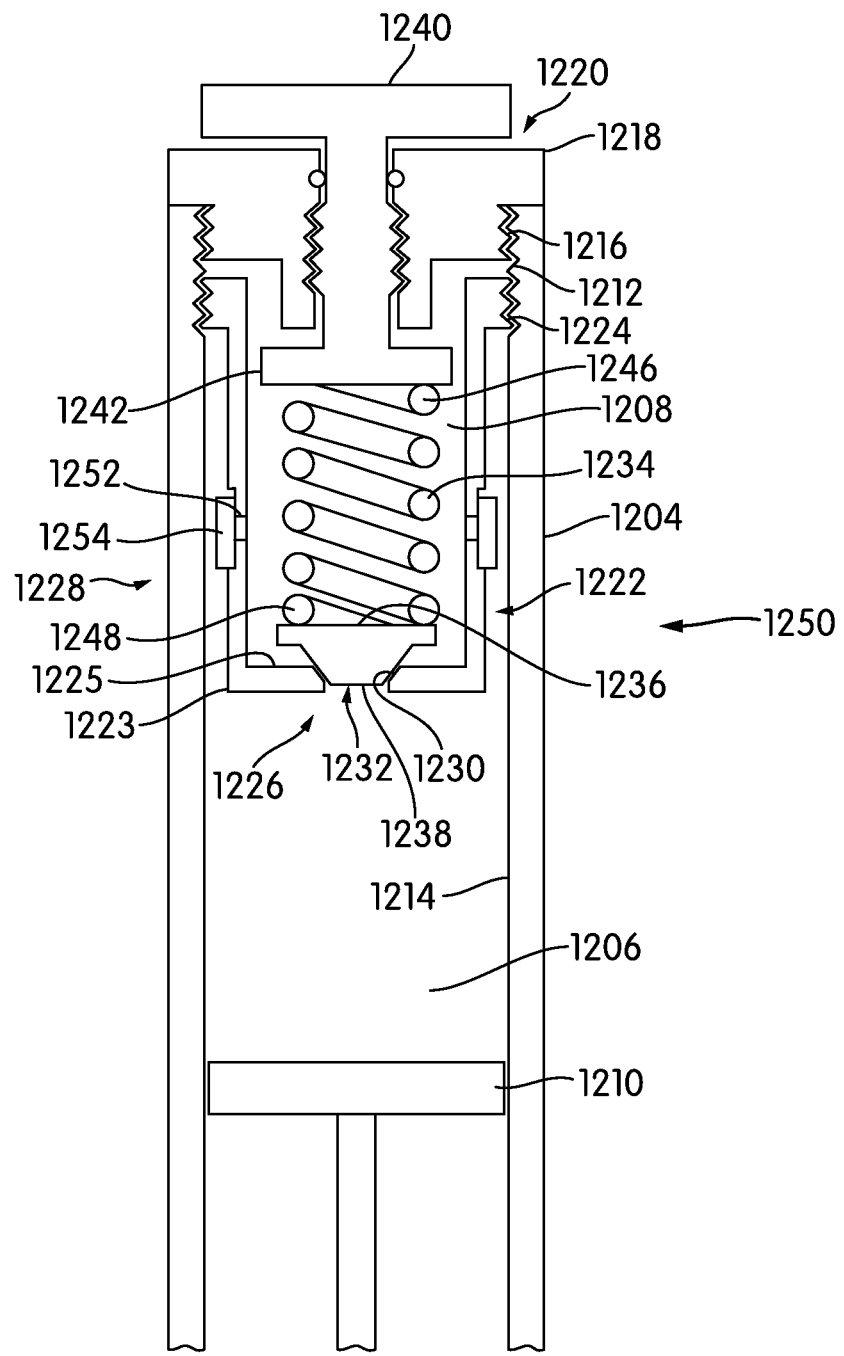
FIG. 12 is a detailed view of yet another alternative embodiment of the area marked 3-3 in FIG. 2.

Turning now to the embodiment of FIG. 12, it will be apparent that the barrier assembly and valves may take a variety of forms. In FIG. 12, yet another embodiment of a damper 1250 analogous to damper 250 of FIG. 2 is illustrated in greater detail. The first annular tube 1204 may define a compression chamber 1206 and a damping chamber 1208. The piston 1210 may slidingly interfit with the first annular tube 1204 and may be capable of compressing a compressible gas in the compression chamber 1206.

The damper 1250 may be incorporated into the first annular tube 1204 remote from the piston 1210. A thread 1212 may be incorporated on an inner surface 1214 of the first annular tube 1204. A corresponding thread 1216 may be incorporated onto an exterior surface 1218 of the head 1220 of the damper 1250. When the damper 1250 is assembled with the first annular tube 1204, the head 1220 of the damper 1250 may form the closed end of the first annular tube 1204. A barrier assembly 1222 may include a thread 1224 and may further be attached to the first annular tube 1204 near an end of the annular tube 1204 by using the thread 1212 on the inner surface 1214 of the first annular tube 1204. In such a configuration, a seal between the barrier assembly 1222 and the first annular tube 1204 may be less important. The barrier assembly 1222 may be designed to restrict or control the passage of compressed gas between the compression chamber 1206 and the damping chamber 1208. The compression chamber 1206 may be on one side 1223 of the barrier assembly 1222 and the damping chamber 1208 may be on another, opposite side 1225 of the barrier assembly 1222.

The damper 1250 may include a first valve 1226 and a second valve 1228. The first valve 1226 may be positioned operatively between and may selectively permit compressed gas to flow from the compression chamber 1206 to the damping chamber 1208. The second valve 1228 may be positioned operatively between and may selectively permit compressed gas to flow from the damping chamber 1208 to the compression chamber 1206.

In the embodiment of FIG. 12, the first valve 1226 may include a first passageway or aperture 1230 through the barrier assembly 1222 that allows the passage of gas between the compression chamber 1206 and the damping chamber 1208. In the configuration illustrated in FIG. 12, the first passageway 1230 may be configured to allow compressed gas to flow from the compression chamber 1206 through the aperture 1230 in the barrier assembly 1222 to the damping chamber 1208.

A first blocker 1232 may be positioned adjacent to or within the first passageway 1230. In the embodiment shown in FIG. 12, the first blocker 1232 may be a frustoconical pin or plate that may have a similar shape and size to the passageway 1230. A first bias, such as the spring 1234, may be positioned adjacent the first blocker 1232. In many embodiments, the first bias 1234 may be a coil spring. In other embodiments, it may be a leaf spring or a resilient elastomer. Other biasing elements may also be used, if desired by a designer. In many embodiments, the first bias 1234 may be configured to bias or urge the first blocker 1232 into a closed position. The first bias 1234 may press against a first end or side 1236 of the first blocker 1232. A second, opposite end or side 1238 of the blocker may interfit with the first passageway 1230. This configuration may allow the first bias 1234 to hold the first blocker 1232 in a maximally restrictive position.

The first blocker 1232 may be acted upon by a variety of forces. First, the first blocker 1232 may be acted upon by gravity to move or retain the first blocker 1232 in the lowest possible position. Next, depending on the position of the first bias 1234 and the adjuster 1240, the first bias 1234 may also exert a force on the bias urging it to its lowest possible position. In many embodiments, the cumulative pressure or force of the compressed gas in the compression chamber 1206, damping chamber 1208, and in other areas of the suspension unit may exert a downward force on the first blocker 1232. These forces may combine to form an effective force applied to the first blocker 1232. In many embodiments, the lowest possible position of the first blocker 1232 may represent a closed position of the first valve 1226, as is the case in FIG. 12.

When the piston assembly 1210 moves upward, it compresses the compressible gas in the compression chamber 1206. This compression creates a pressure or force within the compression chamber 1206. When the force in the compression chamber 1206 exceeds a threshold level of force, this threshold level of force may overcome the effective force. This may move the first blocker 1232 upwardly, thereby opening the first valve 1226 and permitting the compressible gas to flow between the compression chamber 1206 and the damping chamber 1208. In many embodiments, the compressible gas may primarily flow from the compression chamber 1206 through the passageway 1230 and into the damping chamber 1208.

Pressure from the compressible gas in the compression chamber 1206 may variably open the first valve 1226. Because a portion of the effective force urging the first blocker 1232 into a closed position may be applied by a spring, such as the spring 1234, the effective force, particularly the effective spring force of the spring 1234 may vary, based on the degree to which the blocker 1232 is moved. This is due to well-known properties of springs. As the first blocker 1232 is more greatly displaced upwardly (in the orientation of FIG. 12), proportionally more force is required to move the blocker 1232 upward a greater distance. Accordingly, depending on the spring constant of the bias, varying amounts of force from the compressible gas in the compression chamber may cause varying degrees of opening of the first valve 1226. Such choices may improve a rider's feel, by damping the compression of the suspension unit, particularly upon the application of a sharp force to the suspension unit. By selecting an appropriate bias and an appropriate size of the passageway 1230, a person having ordinary skill in the art may appropriately tune the first valve 1226 to open to varying degrees at various thresholds of force. Such design choices are within the scope of a designer of ordinary skill in the art.

Further, in some embodiments, the first valve 1226 may be configured to allow a user to adjust the damping properties of the damper 1250, and more specifically, the first valve 1226. The damper 1250 may include an adjuster 1240 that may be manipulable by a user from the exterior of the vehicle. In the embodiment shown in FIG. 12, the adjuster 1240 is a knob, but may take alternative configurations known by a person having ordinary skill in the art.

The structure and function of the adjuster in FIG. 12 is similar to that in FIGS. 3-7. In the embodiment illustrated in FIG. 12, rotation of the adjuster 1240 may raise or lower a plate 1242. One end 1246 of the first bias 1234 may be in contact with or secured to the plate 1242. The other end 1248 of the first bias 1234 may be in contact with or secured to the first blocker 1232. If the first bias 1234 is secured to each of the plate 1242 and the first blocker 1232, as the first blocker 1232 is displaced upwardly through rotation of the adjuster 1240, the upward spring force on the first blocker 1232 from the first bias 1234 may move the first blocker 1232 within and away from the passageway 1230. Such an upward movement may allow the first blocker 1232 to be positioned to allow the first valve 1226 to remain partially open, with a similar result to that shown and described in connection with FIG. 11. Similarly to the embodiment of FIGS. 3-5, when the adjuster 1240 is rotated to move the plate 1242 downwardly, the first bias 1234 may be compressed and may press the first blocker 1232 more tightly against the first passageway 1230. When a knob is used as the adjuster 1240, it may be desirable to use a circular bias and first blocker in the event that rotational force is transmitted to the bias and/or the blocker. The remaining features, consequences, and implications of similar adjustment structures have been described in sufficient detail in connection with the prior FIGS. and will not be repeated here. A person having ordinary skill in the art will understand how to make appropriate substitutions to achieve similar results in the present embodiment.

In the embodiment of FIG. 12, the damper 1250 may further include a second valve 1228. The second valve 1228 may include a second passageway 1252 that allows the passage of gas between the compression chamber 1206 and the damping chamber 1208. The second passageway 1252 may be a plurality of apertures defined within the barrier assembly 1222. In other embodiments, the second passageway 1252 may be a single aperture defined within the damping barrier 1222. A second blocker 1254 may be positioned adjacent the second passageway 1252 and may be configured to selectively open and close to restrict or control the flow of compressed gas from the damping chamber 1208 to the compression chamber 1206. In the embodiment shown in FIG. 12, the second blocker 1254 may be a resilient or elastomeric band. In such a configuration, the second blocker 1254 may also serve as the second bias. In many embodiments, the second bias is configured to bias or urge the second blocker 1254 into a closed position. The second valve 1228 may be configured such that when the force or pressure within the damping chamber 1208 exceeds that in the compression chamber 1206 by a threshold force, that pressure may deform the second blocker 1254, thereby opening the second valve 1228 and allowing compressed gas to pass between the damping chamber 1208 and the compression chamber 1206.

In some of the embodiments above, it was described that the first blocker could be positioned to keep the first valve in a position where the valve was partially open. Such a configuration in the above embodiments was often a function of the position of the adjuster. In the embodiments described above, the valve could be adjusted to require some threshold force to permit air to flow between the compression chamber and the damping chamber. In some embodiments, however, it may be desirable to allow air passage through a narrow passage between a compression chamber and a damping chamber, with a first valve incorporated to allow for greater airflow upon the application of a force over a certain threshold to the suspension.

Figure 13:
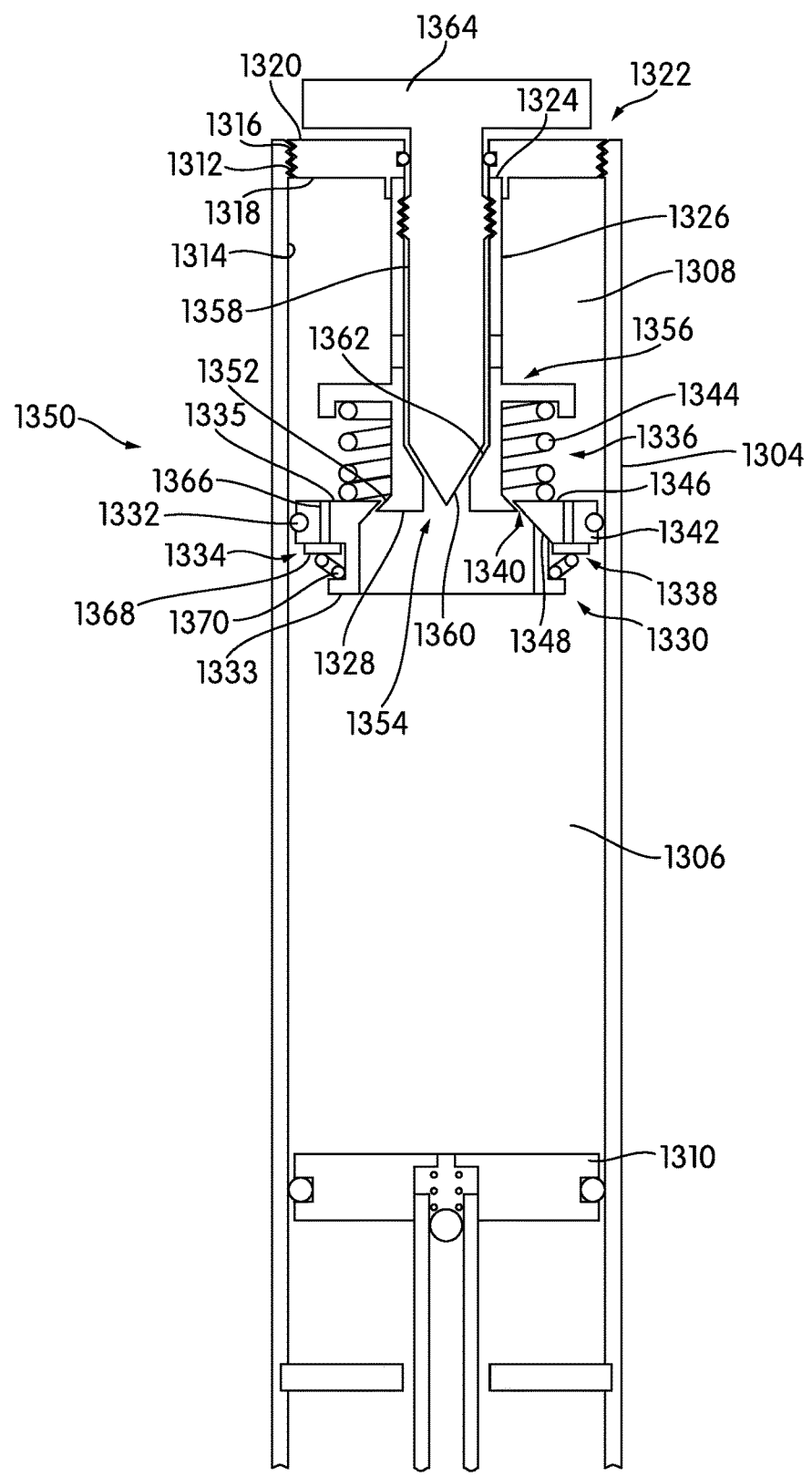
FIG. 13 is a detailed view of yet another alternative embodiment of the area marked 3-3 in FIG. 2.

Turning now to the embodiment of FIG. 13, another embodiment of a damper 1350 is illustrated in greater detail. The first annular tube 1304 may define a compression chamber 1306 and a damping chamber 1308. The piston 1310 may slidingly interfit with the first annular tube 1304 and may be capable of compressing a compressible gas in the compression chamber 1306.

The damper 1350 may be incorporated into the first annular tube 1304. A thread 1312 may be incorporated on an inner surface 1314 of the first annular tube 1304. A corresponding thread 1316 may be incorporated onto an exterior surface 1318 of the head 1320 of the damper 1350. When the damper 1350 is assembled with the first annular tube 1304, the head 1320 of the damper 1350 may form the closed end 1322 of the first annular tube 1304. A first end 1324 of a shaft 1326 may thereby be attached or connected to and extend from the closed end 1322 of the first annular tube 1304. The shaft 1326 may be annular along at least a portion of its length. A barrier assembly 1330 may be positioned at a second end 1328 of the shaft 1326. The barrier assembly 1330 may at least partially define a boundary between the compression chamber 1306 and the damping chamber 1308. In many embodiments, the damper 1350 may be positioned within the first annular tube 1304 remote from the movable piston assembly 1310. In many embodiments, the barrier assembly 1330 may be positioned near the closed end 1322 of the first annular tube 1304.

In some embodiments, the barrier assembly 1330 may include a damping barrier 1334 and a damping seal 1332. The barrier assembly 1330 may be designed to restrict or control the passage of compressed gas between the compression chamber 1306 and the damping chamber 1308. The compression chamber 1306 may be on one side 1333 of the barrier assembly 1330 and the damping chamber 1308 may be on another, opposite side 1335 of the barrier assembly 1330.

The damper 1350 may include a first valve 1336 and a second valve 1338. The first valve 1336 may be positioned operatively between, and may selectively permit compressed gas to flow from, the compression chamber 1306 to the damping chamber 1308. The second valve 1338 may be positioned operatively between, and may selectively permit compressed gas to flow from, the damping chamber 1308 to the compression chamber 1306.

In the embodiment of FIG. 13, the first valve 1336 may include a first passageway 1340 that allows the passage of gas between the compression chamber 1306 and the damping chamber 1308. The first passageway 1340 may be serpentine.

A first blocker 1342 may be positioned adjacent to the second end 1328 of the shaft 1326. A first bias, such as the spring 1344, may be positioned adjacent the first blocker 1342. In many embodiments, the first bias 1344 may be a coil spring. In other embodiments, it may be a leaf spring or a resilient elastomer. Other biasing elements may also be used, if desired by a designer. In many embodiments, the first bias 1344 may be configured to bias or urge the first blocker 1342 into a closed position. The first bias 1344 may press against a first side 1346 of the first blocker 1342. A second, opposite side 1348 of the first blocker 1342 may impinge on a lip or edge 1352 extending outwardly from the shaft 1326.

The first blocker 1342 may be acted upon by a variety of forces. First, the first blocker 1342 may be acted upon by gravity to move or retain the first blocker 1342 in the lowest possible position (in the orientation shown in FIG. 13). Next, depending on the position of the first bias 1344, the first bias 1344 may also exert a force on the first blocker 1342 urging it to its lowest possible position. In many embodiments, the cumulative pressure or force of the compressed gas in the compression chamber 1306, damping chamber 1308, and in other areas of the suspension unit may exert a downward force on the first blocker 1342. These forces may combine to form an effective force applied to the first blocker 1342. In many embodiments, the lowest possible position of the first blocker 1342 may represent a closed position of the first valve 1336, as is the case in FIG. 13.

In contrast to some of the other embodiments, the embodiment of FIG. 13 may include a supplemental passageway 1354 that may permit compressible gas to flow between the compression chamber 1306 and the damping chamber 1308. In the embodiment of FIG. 13, a supplemental variable valve 1356 may be incorporated into the damper 1350 to govern whether the supplemental passageway 1354 is open or closed and the degree to which it is open. In the embodiment of FIG. 13, a pin 1358 may be positioned within the supplemental passageway 1354. In the embodiment shown in FIG. 13, the pin 1358 may have a conical tip 1360 that may be configured to mate with a sloped wall 1362 in the supplemental passageway 1354. When the adjuster 1364 is rotated to fully extend the pin 1358, the conical tip 1360 may meet the sloped wall 1362 in a sealing fashion and substantially prevent the flow of compressed gas through the supplemental passageway 1354. When the adjuster 1364 is rotated in an opposite direction, the conical tip 1360 may separate from the sloped wall 1362 and permit varying amounts of compressed gas to flow through the supplemental passageway 1354.

When the piston assembly 1310 moves upward, it may compress the compressible gas in the compression chamber 1306. This compression creates a pressure or force within the compression chamber 1306. Depending on the degree to which the supplemental valve 1356 is open and the speed and force of compression, the compressed gas may flow from the compression chamber 1306 to the damping chamber 1308 without actuating the first valve 1336. However, when the force in the compression chamber 1306 exceeds a threshold level of force, this threshold level of force may overcome the effective force. This may move the first blocker 1342 upwardly, thereby opening the first valve 1336 and permitting the compressible gas to flow between the compression chamber 1306 and the damping chamber 1308 through the first passageway 1340.

Pressure from the compressible gas in the compression chamber 1306 may variably open the first valve 1336. Because a portion of the effective force urging the first blocker 1342 into a closed position may be applied by a spring, such as the spring 1344, the effective force, particularly the effective spring force of the spring 1344 may vary, based on the degree to which the blocker 1342 is moved. This is due to well-known properties of springs. As the first blocker 1342 is more greatly displaced upwardly, proportionally more force is required to move the blocker 1342 upward a greater distance. Accordingly, depending on the spring constant of the bias, varying amounts of force from the compressible gas in the compression chamber may cause varying degrees of opening of the first valve 1336. Such choices may improve a rider's feel, by damping the compression of the suspension unit, particularly upon the application of a sharp force to the suspension unit. By selecting an appropriate bias, a person having ordinary skill in the art may appropriately tune the first valve 1336 to open to varying degrees at various thresholds of force. Such design choices are within the scope of a designer of ordinary skill in the art.

In the embodiment of FIG. 13, the damper 1350 may further include a second valve 1338. The second valve 1338 may include a second passageway 1366 that allows the passage of gas between the compression chamber 1306 and the damping chamber 1308. The second passageway 1366 may be a plurality of apertures defined within the damping barrier 1334. A second blocker 1368 may be positioned adjacent the second passageway 1366 and may be configured to selectively open and close to restrict or control the flow of compressed gas from the damping chamber 1308 to the compression chamber 1306. In the embodiment shown in FIG. 13, the second blocker 1368 may be a shim, and in particular may be a flexible shim. A second bias, such as a resilient bias 1370, may be positioned adjacent the second blocker 1368 to define the properties under which the second blocker 1368 may move to its open position. Other biasing elements may also be used, if desired by a designer. In many embodiments, the second bias is configured to bias or urge the second blocker 1368 into a closed position.

The use of the adjuster 1364 to control the degree of opening of the supplemental valve 1356 may affect the timing at which the first valve 1336 may open. When the adjuster 1364 is adjusted to a first extreme position, where the conical tip 1360 of the pin 1358 presses against the sloped wall 1362 of the supplemental passageway 1354, air flow through the supplemental passageway 1354 may be substantially prevented. Accordingly, upon compression, the pressure or force within the compression chamber 1306 may rise relatively quickly to the threshold level of force necessary to overcome the effective force and open the first valve 1336. When the adjuster 1364 is adjusted to a second extreme position, where the conical tip 1360 of the pin 1358 is remote from the sloped wall 1362 of the supplemental passageway 1354, upon compression, the compressible gas in the compression chamber 1306 may flow into the damping chamber 1308 only through the supplemental passageway 1354 and substantially equalize pressure on both sides of the first blocker 1342. In such a situation, the first valve 1336 may only open and allow compressed gas to flow through both the first passageway 1340 and the supplemental passageway 1354 in instances of rapid compression. If the adjuster 1364 is in an intermediate position, it may allow compressed gas to flow through the supplemental passageway 1354 only in some instances and through both passageways 1340, 1354 in other instances. Accordingly, while the adjustment of the adjuster 1364 may not affect the actual effective force, the adjustment of the adjuster 1364 may influence the opening of the first valve 1336. While this description has been detailed for the function of the first valve 1336, it will be apparent to a person having ordinary skill in the art that the function of the second valve 1338 may be similarly affected by the use of the supplemental valve 1356.

Figure 14:
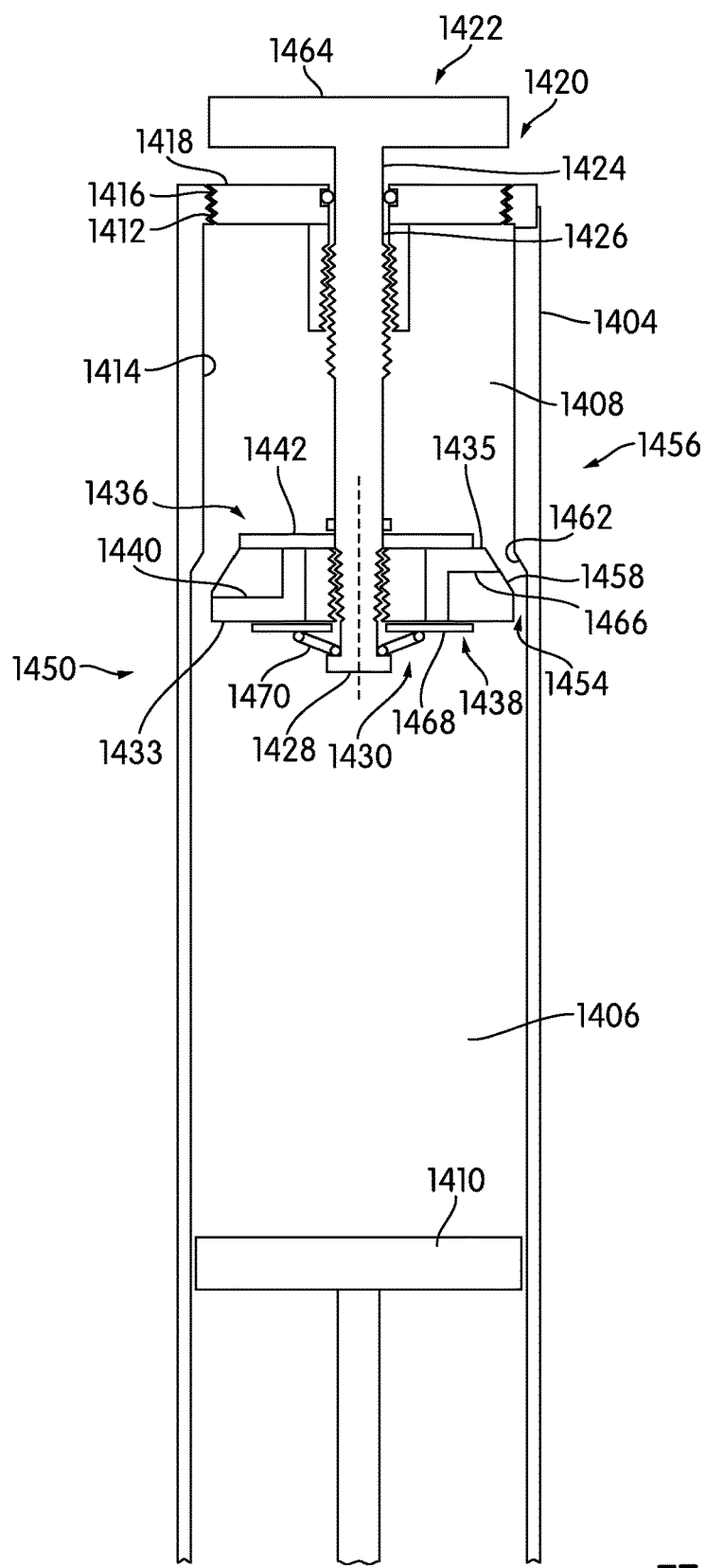
FIG. 14 is a detailed view of yet another alternative embodiment of the area marked 3-3 in FIG. 2.

A similar configuration may be found in FIG. 14, where another embodiment of a damper 1450 is illustrated in greater detail. The first annular tube 1404 may define a compression chamber 1406 and a damping chamber 1408. The piston 1410 may slidingly interfit with the first annular tube 1404 and may be capable of compressing a compressible gas in the compression chamber 1406.

The damper 1450 may be incorporated into the first annular tube 1404. A thread 1412 may be incorporated on an inner surface 1414 of the first annular tube 1404. A corresponding thread 1416 may be incorporated onto an exterior surface 1418 of the head 1420 of the damper 1450. When the damper 1450 is assembled with the first annular tube 1404, the head 1420 of the damper 1450 may form the closed end 1422 of the first annular tube 1404. A first end 1424 of a shaft 1426 may thereby be attached or connected to and extend from the closed end 1422 of the first annular tube 1404. A barrier assembly 1430 may be positioned at a second end 1428 of the shaft 1426. The barrier assembly 1430 may define a boundary between the compression chamber 1406 and the damping chamber 1408. In many embodiments, the damper 1450 may be positioned within the first annular tube 1404 remote from the movable piston assembly 1410. In many embodiments, the barrier assembly 1430 may be positioned near the closed end 1422 of the first annular tube 1404. The compression chamber 1406 may be on one side 1433 of the barrier assembly 1430 and the damping chamber 1408 may be on another, opposite side 1435 of the barrier assembly 1430.

The damper 1450 may include a first valve 1436 and a second valve 1438. The first valve 1436 may be positioned operatively between and may selectively permit compressed gas to flow from the compression chamber 1406 to the damping chamber 1408. The second valve 1438 may be positioned operatively between and may selectively permit compressed gas to flow from the damping chamber 1408 to the compression chamber 1406.

In the embodiment of FIG. 14, the first valve 1436 may include a first passageway 1440 that may allow the passage of gas between the compression chamber 1406 and the damping chamber 1408. The first passageway 1440 may be serpentine.

A first blocker 1442 may be positioned adjacent the barrier assembly 1430. The first blocker 1442 may be a resilient shim that is self-biasing, so that the first blocker 1442 is also the first bias. In other embodiments, a separate bias may also be used, if desired by a designer. In many embodiments, the first blocker 1442 may configured to bias itself into a closed position.

The first blocker 1442 may be acted upon by a variety of forces. First, the first blocker 1442 may be acted upon by gravity to move or retain the first blocker 1442 in the lowest possible position. Next, the bias in the first blocker 1442 may also exert a force urging it to its lowest possible position. In many embodiments, the cumulative pressure or force of the compressed gas in the compression chamber 1406, damping chamber 1408, and in other areas of the suspension unit may exert a downward force on the first blocker 1442. These forces may combine to form a effective force applied to the first blocker 1442. In many embodiments, the lowest possible position of the first blocker 1442 may represent a closed position of the first valve 1436, as is the case in FIG. 14.

In contrast to some of the other embodiments, the embodiment of FIG. 14 may include a supplemental passageway 1454 that permits compressible gas to flow between the compression chamber 1406 and the damping chamber 1408. In the embodiment of FIG. 14, a supplemental variable valve 1456 may be incorporated into the damper 1450 to govern whether the supplemental passageway 1454 is open or closed and the degree to which it is open. In the embodiment of FIG. 14, the barrier assembly 1430 may be configured to be separated from the first annular tube 1404. In the embodiment shown in FIG. 14, the barrier assembly 1430 may have a sloped wall 1458 that may be configured to mate with a sloped wall 1462 on the inner surface 1414 of the first annular tube 1404. When the adjuster 1464 is rotated to fully retract the barrier assembly 1430, the sloped wall 1458 of the barrier assembly 1430 may meet the sloped wall 1462 of the first annular tube 1404 in a sealing fashion and substantially prevent the flow of compressed gas through the supplemental passageway 1454. When the adjuster 1464 is rotated in an opposite direction, the barrier assembly 1430 may separate from the annular tube 1404 and permit varying amounts of compressed gas to flow through the supplemental passageway 1454.

When the piston assembly 1410 moves upward, it may compress the compressible gas in the compression chamber 1406. This compression creates a pressure or force within the compression chamber 1406. Depending on the degree to which the supplemental valve 1456 is open and the speed and force of compression, the compressed gas may flow from the compression chamber 1406 to the damping chamber 1408 without actuating the first valve 1436. However, when the force in the compression chamber 1406 exceeds a threshold level of force, this threshold level of force may overcome the effective force. This may move the first blocker 1442 upwardly, thereby opening the first valve 1436 and permitting the compressible gas to flow between the compression chamber 1406 and the damping chamber 1408 through the first passageway 1440.

Pressure from the compressible gas in the compression chamber 1406 may variably open the first valve 1436. Because a portion of the effective force urging the first blocker 1442 into a closed position may be applied by a bias, the effective force, particularly the effective spring force of the bias may vary, based on the degree to which the blocker 1442 is moved. This is due to well-known properties of biases. As the first blocker 1442 is more greatly displaced upwardly, proportionally more force is required to move the blocker 1442 upward a greater distance. Accordingly, depending on the spring constant of the bias, varying amounts of force from the compressible gas in the compression chamber may cause varying degrees of opening of the first valve 1436. Such choices may improve a rider's feel, by damping the compression of the suspension unit, particularly upon the application of a sharp force to the suspension unit. By selecting an appropriate bias, a person having ordinary skill in the art may appropriately tune the first valve 1436 to open to varying degrees at various thresholds of force. Such design choices are within the scope of a designer of ordinary skill in the art.

In the embodiment of FIG. 14, the damper 1450 may further include a second valve 1438. The second valve 1438 may include a second passageway 1466 that allows the passage of gas between the compression chamber 1406 and the damping chamber 1408. The second passageway 1466 may be a plurality of apertures defined within the damping barrier 1434. A second blocker 1468 may be positioned adjacent the second passageway 1466 and may be configured to selectively open and close to restrict or control the flow of compressed gas from the damping chamber 1408 to the compression chamber 1406. In the embodiment shown in FIG. 14, the second blocker 1468 may be a shim, and in particular may be a flexible shim. A second bias, such as a resilient bias 1470, may be positioned adjacent the second blocker 1468 to define the properties under which the second blocker 1468 may move to its open position. Other biasing elements may also be used, if desired by a designer. In many embodiments, the second bias is configured to bias or urge the second blocker 1468 into a closed position.

The use of the adjuster 1464 to control the degree of opening of the supplemental valve 1456 may affect the timing at which the first valve 1436 may open. When the adjuster 1464 is adjusted to a first extreme position, where the sloped wall 1458 of the barrier assembly 1430 presses against the sloped wall 1462 of the first annular tube 1404, air flow through the supplemental passageway 1454 may be substantially prevented. Accordingly, upon compression, the pressure or force within the compression chamber 1406 may rise relatively quickly to the threshold level of force necessary to overcome the effective force and open the first valve 1436. When the adjuster 1464 is adjusted to a second extreme position, where the sloped wall 1458 of the barrier assembly 1430 is remote from the sloped wall 1462 of the first annular tube 1404, upon compression, the compressible gas in the compression chamber 1406 may flow into the damping chamber 1408 and substantially equalize pressure on both sides of the first blocker 1442. In such a situation, the first valve 1436 may only open and allow compressed gas to flow through both the first passageway 1440 and the supplemental passageway 1454 in instances of rapid compression. If the adjuster 1464 is in an intermediate position, it may allow compressed gas to flow through the supplemental passageway 1454 only in some instances and through both passageways 1440, 1454 in other instances. Accordingly, while the adjustment of the adjuster may not affect the actual effective force, the adjustment of the adjuster may influence the opening of the first valve 1436. While this description has been detailed for the function of the first valve 1436, it will be apparent to a person having ordinary skill in the art that the function of the second valve 1438 may be similarly affected by the use of the supplemental valve 1456.

The above embodiments have been described in connection with a front fork or suspension. In some instances, the embodiments above could be incorporated into a rear shock. However, because of the length of the average compression stroke in a rear shock is shorter than that in a front fork, use of an inline system may be less desirable. Accordingly, additional modifications may be desirable when adapted for a rear shock. A person having ordinary skill in the art could, however, choose to use a design illustrated for use in a rear shock in a front fork or vice versa, if such a designer wished.

Figure 15:
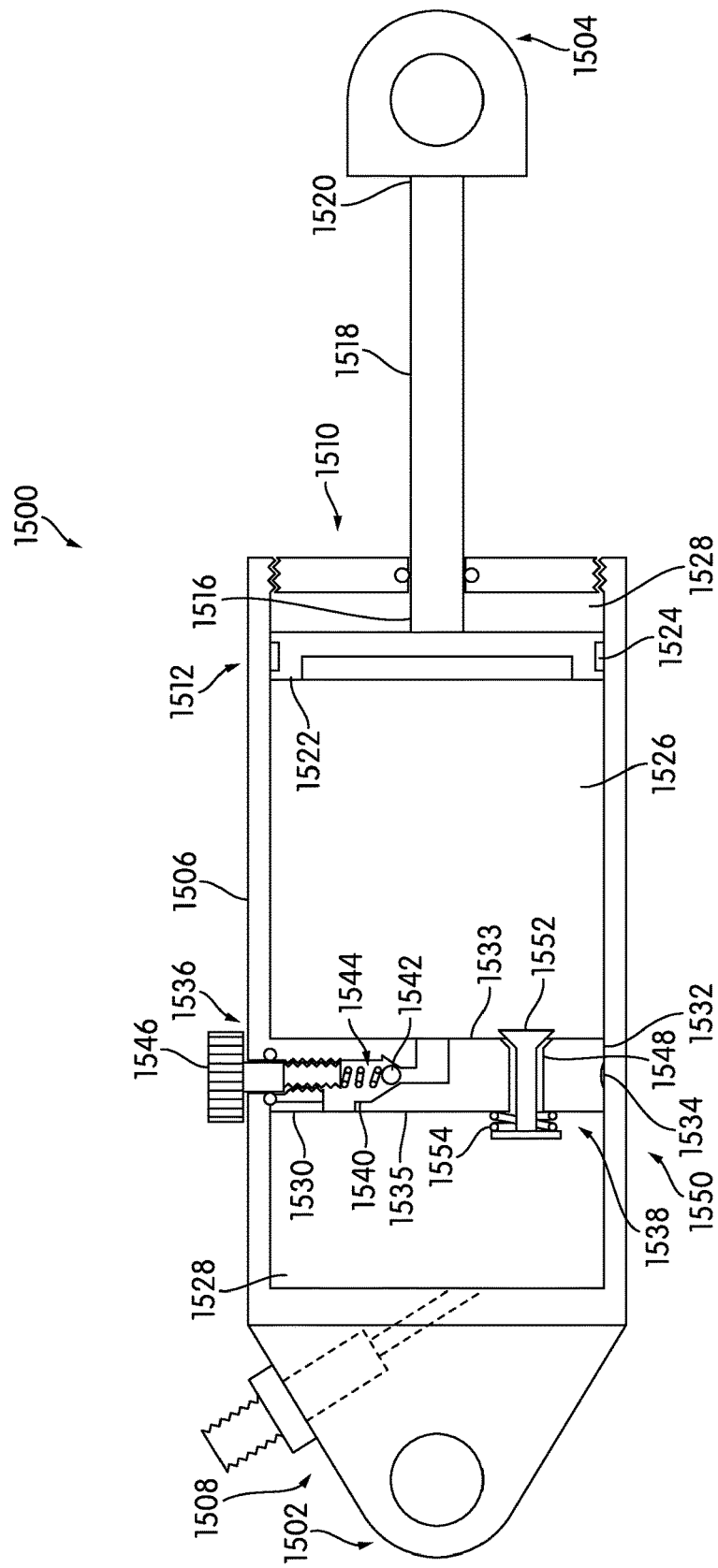
FIG. 15 is a side cross-sectional view of a rear shock absorber of a bicycle according to the disclosed embodiments.

FIG. 15 illustrates a suspension system 1500 for a vehicle (not shown). The embodiments shown are illustrated in the context of a bicycle. However, the designs could be modified for use with a vehicle having more than two wheels or a vehicle powered by a motor. The top end 1502 of the suspension system may be directly or indirectly attached a vehicle frame (not shown) in a typical manner. The bottom end 1504 of the suspension system 1500 may be directly or indirectly attached to a vehicle wheel (not shown) in a typical manner.

In the embodiment shown in FIG. 15, the details of a typical suspension system may not be illustrated in detail. Such structures are well-known by persons of ordinary skill in the art. The structures shown are merely exemplary. Other structures currently known or developed in the future could be substituted therefor by a person of ordinary skill in the art without undue experimentation.

The suspension system 1500 may include a first annular tube 1506. The first annular tube 1506 may have a first closed end 1508 at the top of the first annular tube 1506 and second closed end 1510 at the bottom of the first annular tube 1506. The space defined within the first annular tube 1506 may be at least partially filled with one or more compressible gases. In many configurations, the first annular tube 1506 may be substantially round in cross-sectional configuration.

A movable piston assembly 1512 may be attached to the bottom end 1504. In the embodiment shown, the movable piston assembly 1512 may be attached to one end 1516 of a shaft 1518. A second, opposing end 1520 of the shaft 1518 may be attached to the bottom end 1504. Such a configuration is not required, but in many embodiments it may be an efficient design. The length of the shaft 1518 may be determined based on the length, circumference, and volume of the first annular tube 1506 based on conventional calculations.

The movable piston assembly 1512 may include a movable piston 1522 and an optional seal 1524. The movable piston assembly 1512 may be designed to prevent or minimize the passage of compressed gas between a compression chamber 1526 and a lower chamber 1528. In many embodiments, because the movable piston 1522 is configured to move, it may be desirable for the movable piston 1522 to have a smaller diameter than the inner diameter of the first annular tube 1506. The seal 1524 may be configured to bridge the distance between the diameter of the movable piston 1522 and the diameter of the first annular tube 1506. Such a seal 1524 is conventional and may be selected by a person having ordinary skill in the art in a known manner based, at least in part, on manufacturing tolerances, size, and the desired pressure of the pressurized gas within the first annular tube 1506. The piston assembly 1512, shaft 1518, and much of the remainder of the suspension system are merely shown and described generally and schematically. Other suspension structures could be easily substituted therefor.

A damper 1550 may be incorporated near the first closed end 1508 of the first annular tube 1506. The first annular tube 1506 may define a compression chamber 1526 and a damping chamber 1528. The piston 1522 may slidingly interfit with the first annular tube 1506 and may be capable of compressing a compressible gas in the compression chamber 1526.

The damper 1550 may be incorporated into the first annular tube 1506. A barrier assembly 1530 may be inserted into the first annular tube 1506 and positioned near the first closed end 1508 of the first annular tube 1506 and remote from the movable piston 1522. The barrier assembly 1530 may at least partially define a boundary between the compression chamber 1526 and the damping chamber 1528. In some embodiments, the barrier assembly 1530 may include a damping barrier 1532 and a damping seal 1534. The barrier assembly 1530 may be designed to restrict or control the passage of compressed gas between the compression chamber 1526 and the damping chamber 1528. In many embodiments, because the damping barrier 1532 may be configured to remain substantially stationary within the first annular tube 1506, the damping seal 1534 may be unnecessary and the damping barrier 1532 may be designed to interfit with the first annular tube 1506 with a tight tolerance. In other embodiments, it may be desirable for the damping barrier 1532 to have a smaller diameter than the diameter of the first annular tube 1506. The damping seal 1534 may be configured to bridge the distance between the diameter of the damping barrier 1532 and the diameter of the first annular tube 1506. Such a damping seal 1534 is conventional and may be selected by a person having ordinary skill in the art in a known manner based, at least in part, on manufacturing tolerances, size, and the desired pressure of the pressurized gas within the first annular tube 1506. The compression chamber 1526 may be on one side 1533 of the barrier assembly 1530 and the damping chamber 1528 may be on another, opposite side 1535 of the barrier assembly 1530.

The damper 1550 may include a first valve 1536 and a second valve 1538. The first valve 1536 may be positioned operatively between, and may selectively permit compressed gas to flow from, the compression chamber 1526 to the damping chamber 1528. The second valve 1538 may be positioned operatively between, and may selectively permit compressed gas to flow from, the damping chamber 1528 to the compression chamber 1526.

The first valve 1536 may include a first passageway 1540 that allows the passage of gas between the compression chamber 1526 and the damping chamber 1528. The first passageway 1540 may be serpentine. A first blocker 1542 may be positioned adjacent to or within the first passageway 1540. In the embodiment shown in FIG. 15, the first blocker 1542 may be a ball. A first bias, such as the spring 1544, may be positioned adjacent the first blocker 1542. In many embodiments, the first bias 1544 may be a coil spring. In other embodiments, it may be a leaf spring or a resilient elastomer. Other biasing elements may also be used, if desired by a designer. In many embodiments, the first bias 1544 may be configured to bias or urge the first blocker 1542 into a closed position.

The first blocker 1542 may be acted upon by a variety of forces. First, the first blocker 1542 may be acted upon by gravity to move or retain the first blocker 1542 in the closed position. Next, depending on the position of the first bias 1544 and the adjuster 1546 (as will be described in greater detail below), the first bias 1544 may also exert a force on the first blocker 1542 urging it to its closed position. In many embodiments, the cumulative pressure or force of the compressed gas in the compression chamber 1526, damping chamber 1528, and in other areas of the suspension unit may exert a force on the first blocker 1542. These forces may combine to form an effective force applied to the first blocker 1542.

In use, a rider is likely to ride the vehicle over areas of terrain with a variety of obstacles. When a rider encounters an obstacle, the suspension unit 1500 may be configured to absorb at least some of the force of the impact. In such an instance, the movable piston assembly 1512 may move upwardly within the first annular tube 1506. This movement may serve to compress the compressible gas within the compression chamber 1526. In some instances, the force of the compressible gas in the compression chamber 1526 may function as in a conventional suspension. However, in other instances, the compression of the compressible gas may actuate the damper 1550 to damp the compression and reduce shock passing to the rider.

When the piston assembly 1512 moves upward, it compresses the compressible gas in the compression chamber 1526. This compression creates a pressure or force within the compression chamber 1526. When the force in the compression chamber 1526 exceeds a threshold level of force, this threshold level of force may overcome the effective force. This may move the first blocker 1542, thereby opening the first valve 1536 and permitting the compressible gas to flow between the compression chamber 1526 and the damping chamber 1528. In many embodiments, the compressible gas may primarily flow from the compression chamber 1526 through the serpentine passageway 1540 and into the damping chamber 1528.

Pressure from the compressible gas in the compression chamber 1526 may variably open the first valve 1536. Because a portion of the effective force urging the first blocker 1542 into a closed position may be applied by a spring, such as the spring 1544, the effective force, particularly the effective spring force of the spring 1544 may vary, based on the degree to which the blocker 1542 is moved. This is due to well-known properties of springs. As the first blocker 1542 is more greatly displaced, proportionally more force is required to move the blocker 1542 a greater distance. Accordingly, depending on the spring constant of the bias, varying amounts of force from the compressible gas in the compression chamber may cause varying degrees of opening of the first valve 1536. By selecting an appropriate bias 1544 and an appropriate size of the passageway 1540, a person having ordinary skill in the art may appropriately tune the first valve 1536 to open to varying degrees at various thresholds of force. Such choices may improve a rider's feel, by damping the compression of the suspension unit, particularly upon the application of a sharp force to the suspension unit. Such design choices are within the scope of a designer of ordinary skill in the art.

Further, in some embodiments, the first valve 1536 may be configured to allow a user to adjust the damping properties of the damper 1550, and more specifically, the first valve 1536. The damper 1550 may include an adjuster 1546 that may be manipulable by a user from the exterior of the vehicle. In some embodiments, the adjuster 1546 may be a knob. The adjuster 1546 may be configured to directly or indirectly interact with the first bias 1544 to reduce the force exerted by the first bias 1544 by changing the preload on the bias 1544. The details of how the adjuster 1546 functions and the varying possible positions of the adjuster 1546 were analogously described in connection with other embodiments. The features of the adjuster of the present embodiment are substantially similar and will not be further detailed for this embodiment.

The damper 1550 may further include a second valve 1538. The second valve 1538 may include a second passageway 1548 that allows the passage of gas between the compression chamber 1526 and the damping chamber 1528. The second passageway 1548 may be one or a plurality of apertures defined within the damping barrier 1532. A second blocker 1552 may be positioned adjacent the second passageway 1548 and may be configured to selectively open and close to restrict or control the flow of compressed gas from the damping chamber 1528 to the compression chamber 1526. In the embodiment of FIG. 15, the second blocker 1552 may be a tapered pin capable of interfitting with the second passageway 1548. A second bias, such as the spring 1554, may be positioned adjacent the second blocker 1552 to define the properties under which the second blocker 1552 may move to its open position. In many embodiments, the second bias 1554 may be a coil spring. In other embodiments, it may be a leaf spring or a resilient elastomer. Other biasing elements may also be used, if desired by a designer. In many embodiments, the second bias is configured to bias or urge the second blocker 1552 into a closed position.

Figure 16:
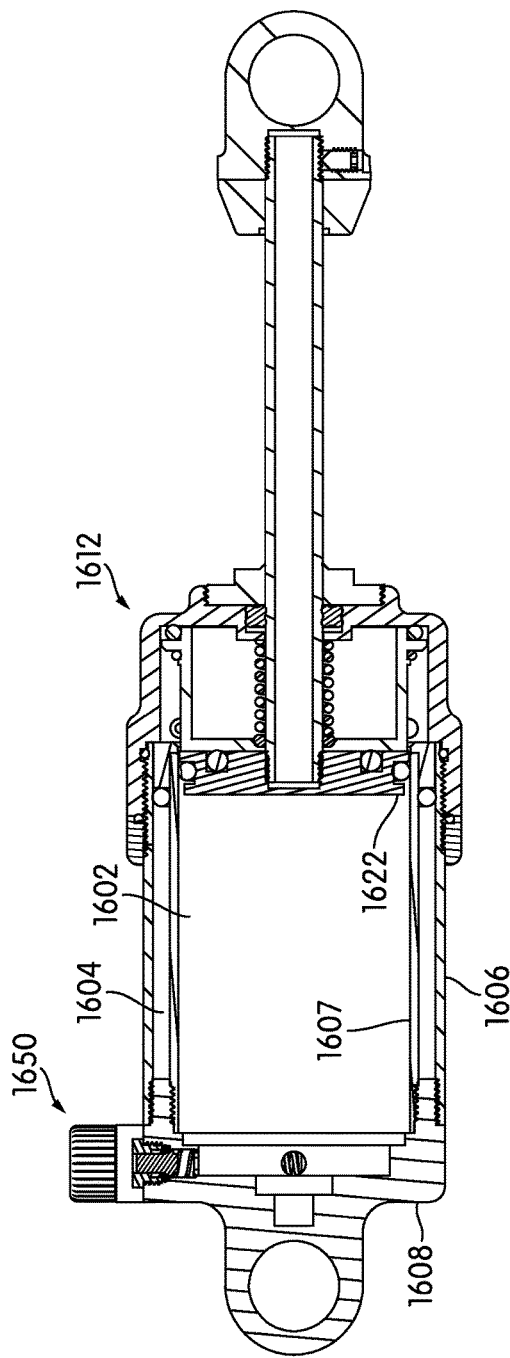
FIG. 16 is a side cross-sectional view of an alternative embodiment of a rear shock absorber of a bicycle.
Figure 17:
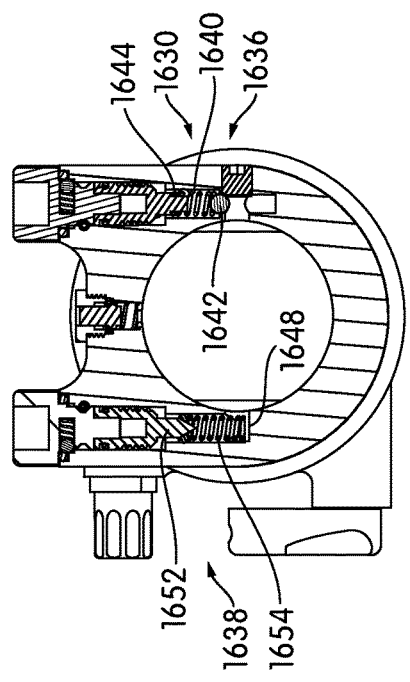
FIG. 17 is a top cross-sectional view of the embodiment of FIG. 16.

The embodiment of FIGS. 16 and 17 share many elements in common with the embodiment of FIG. 15. The function of the embodiments is substantially the same. Many of the structural elements are substantially the same as those in FIG. 15. Only where there is a difference is the difference described. In addition, most of the design changes between the configurations can be mixed and matched. A person having ordinary skill in the art will be able to make such changes without undue experimentation.

Turning now to the embodiment of FIGS. 16 and 17, it is noted that the damping chamber is positioned annularly around the compression chamber, rather than being inline with the compression chamber as with other embodiments. In many embodiments incorporated into a rear shock, it may be desirable to use such a configuration, rather than attempting to make an inline system. The use of an annular damping chamber may allow for a greater distance of travel for the piston, thereby creating an improved ride feel in many embodiments. A person having ordinary skill in the art is able to modify any of the described embodiments to position an appropriate valve or valves drawn from any of the other embodiments in the manner shown in FIGS. 16 and 17 and described herein to make such an adjustment. While this positioning of the damping chamber is shown only in connection with a rear shock, it is possible to modify a front fork to use a similar damping chamber. Further, if desired, the damping chamber could be positioned remote from the compression chamber in any embodiment and connected with a tube or another device allowing the flow of compressed gas. Such devices should be considered as falling within the scope of the disclosure and claims.

In the embodiment of FIGS. 16 and 17, a damper 1650 may be incorporated near the closed end 1608 of the first annular tube 1606. The first annular tube 1606 may define a compression chamber 1602 and an annular damping chamber 1604. In some embodiments, the damping chamber 1604 may be concentric with the compression chamber 1602. The piston 1622 may slidingly interfit with an inner diameter 1607 of the first annular tube 1606 and may be capable of compressing a compressible gas in the compression chamber 1602.

The damper 1650 may be incorporated into the first annular tube 1606. A barrier assembly 1630 may be positioned at the closed end 1608 of the first annular tube 1606 and remote from the movable piston 1622. The barrier assembly 1630 may define a boundary between the compression chamber 1602 and the damping chamber 1604. The barrier assembly 1630 may be designed to restrict or control the passage of compressed gas between the compression chamber 1602 and the damping chamber 1604. The compression chamber 1602 may be on one side of the barrier assembly 1630 and the damping chamber 1604 may be on another side of the barrier assembly 1630.

The damper 1650 may include a first valve 1636 and a second valve 1638. The first valve 1636 may be positioned operatively between and may selectively permit compressed gas to flow from the compression chamber 1602 to the damping chamber 1604. The second valve 1638 may be positioned operatively between and may selectively permit compressed gas to flow from the damping chamber 1604 to the compression chamber 1602.

The first valve 1636 may include a first passageway 1640 that allows the passage of gas between the compression chamber 1602 and the damping chamber 1604. The first passageway 1640 may be serpentine. A first blocker 1642 may be positioned adjacent to or within the first passageway 1640. In the embodiment shown in FIGS. 16 and 17, the first blocker 1642 may be a ball. A first bias, such as the spring 1644, may be positioned adjacent the first blocker 1642. In many embodiments, the first bias 1644 may be a coil spring. In other embodiments, it may be a leaf spring or a resilient elastomer. Other biasing elements may also be used, if desired by a designer. In many embodiments, the first bias 1644 may be configured to bias or urge the first blocker 1642 into a closed position.

The first blocker 1642 may be acted upon by a variety of forces. First, the first blocker 1642 may be acted upon by gravity to move or retain the first blocker 1642 in the closed position. Next, depending on the position of the first bias 1644 and the adjuster 1646 (as will be described in greater detail below), the first bias 1644 may also exert a force on the first blocker 1642 urging it to its closed position. In many embodiments, the cumulative pressure or force of the compressed gas in the compression chamber 1602, damping chamber 1604, and in other areas of the suspension unit may exert a force on the first blocker 1642. These forces may combine to form an effective force applied to the first blocker 1642.

In use, a rider is likely to ride the vehicle over areas of terrain with a variety of obstacles. When a rider encounters an obstacle, the suspension unit 1600 may be configured to absorb at least some of the force of the impact. In such an instance, the movable piston assembly 1612 may move upwardly within the first annular tube 1606. This movement may serve to compress the compressible gas within the compression chamber 1602. In some instances, the force of the compressible gas in the compression chamber 1602 may function as in a conventional suspension. However, in other instances, the compression of the compressible gas may actuate the damper 1650 to damp the compression and reduce shock passing to the rider.

When the piston assembly 1612 moves upward (to the left in the orientation of FIG. 16), it compresses the compressible gas in the compression chamber 1602. This compression creates a pressure or force within the compression chamber 1602. When the force in the compression chamber 1602 exceeds a threshold level of force, this threshold level of force may overcome the effective force. This may move the first blocker 1642, thereby opening the first valve 1636 and permitting the compressible gas to flow between the compression chamber 1602 and the damping chamber 1604. In many embodiments, the compressible gas may primarily flow from the compression chamber 1602 through the serpentine passageway 1640 and into the damping chamber 1604.

Pressure from the compressible gas in the compression chamber 1602 may variably open the first valve 1636. Because a portion of the effective force urging the first blocker 1642 into a closed position may be applied by a spring, such as the spring 1644, the effective force, particularly the effective spring force of the spring 1644 may vary, based on the degree to which the blocker 1642 is moved. This is due to well-known properties of springs. As the first blocker 1642 is more greatly displaced, proportionally more force is required to move the blocker 1642 a greater distance. Accordingly, depending on the spring constant of the bias, varying amounts of force from the compressible gas in the compression chamber may cause varying degrees of opening of the first valve 1636. By selecting an appropriate bias 1644 and an appropriate size of the passageway 1640, a person having ordinary skill in the art may appropriately tune the first valve 1636 to open to varying degrees at various thresholds of force. Such choices may improve a rider's feel, by damping the compression of the suspension unit, particularly upon the application of a sharp force to the suspension unit. Such design choices are within the scope of a designer of ordinary skill in the art.

Further, in some embodiments, the first valve 1636 may be configured to allow a user to adjust the damping properties of the damper 1650, and more specifically, the first valve 1636. The damper 1650 may include an adjuster 1646 that may be manipulable by a user from the exterior of the vehicle. In some embodiments, the adjuster 1646 may be a knob. The adjuster 1646 may be configured to directly or indirectly interact with the first bias 1644 to reduce the force exerted by the first bias 1644 by changing the preload on the bias 1644. The details of how the adjuster 1646 functions and the varying possible positions of the adjuster 1646 were analogously described in connection with other embodiments. The features of the adjuster of the present embodiment are substantially similar and will not be further detailed for this embodiment.

The damper 1650 may further include a second valve 1638. The second valve 1638 may include a second passageway 1648 that allows the passage of gas between the compression chamber 1602 and the damping chamber 1604. The second passageway 1648 may be one or a plurality of apertures defined within the barrier assembly 1630. A second blocker 1652 may be positioned adjacent the second passageway 1648 and may be configured to selectively open and close to restrict or control the flow of compressed gas from the damping chamber 1604 to the compression chamber 1602. A second bias, such as the spring 1654, may be positioned adjacent the second blocker 1652 to define the properties under which the second blocker 1652 may move to its open position. In many embodiments, the second bias 1654 may be a coil spring. In other embodiments, it may be a leaf spring or a resilient elastomer. Other biasing elements may also be used, if desired by a designer. In many embodiments, the second bias is configured to bias or urge the second blocker 1652 into a closed position.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:
1. A suspension unit for a bicycle, comprising:
an annular tube defining a compression chamber;
a piston slidingly interfitting with the annular tube and capable of reciprocating with respect to the annular tube, the piston capable of compressing a compressible gas in the compression chamber;

a barrier assembly remote from the piston, comprising a damping barrier in fixed position near one end of the annular tube, the compression chamber being on one side of the barrier assembly and a damping chamber being on another side of the barrier assembly; and a first valve adjacent the damping barrier and operatively between the compression chamber and the damping chamber and capable of permitting the compressible gas to flow between the compression chamber and the damping chamber;

wherein an effective force is applied to a blocker in the first valve, the effective force influencing a threshold level of force of compressed gas in the compression chamber capable of opening the first valve.

2. The suspension unit for a bicycle according to claim 1, wherein the effective force is at least partially applied by a bias.

3. The suspension unit for a bicycle according to claim 2, wherein the bias is a spring.

4. The suspension unit for a bicycle according to claim 1, wherein the blocker comprises a resilient material, the resilient material applying at least part of the effective force.

5. The suspension unit for a bicycle according to claim 1, wherein the barrier assembly is connected to the annular tube in a substantially fixed position.

6. The suspension unit for a bicycle according to claim 1, wherein the barrier assembly is adjustably connected to the annular tube.

7. The suspension unit for a bicycle according to claim 1, wherein the barrier assembly is located substantially within the annular tube.

8. The suspension unit for a bicycle according to claim 1, further comprising an adjuster operatively connected to the first valve and capable of adjusting at least a portion of the effective force.

9. The suspension unit for a bicycle according to claim 1, wherein the barrier assembly and a shaft connecting the barrier assembly to the annular tube at least partially define a serpentine passageway.

10. The suspension unit for a bicycle according to claim 1, further comprising a second valve operatively between the compression chamber and the damping chamber and capable of permitting the compressible gas to flow between the damping chamber and the compression chamber.

11. A suspension unit for a bicycle, comprising:

an annular tube defining a compression chamber and a damping chamber, each of the compression chamber and the damping chamber being filled with a compressible gas;

a movable piston slidingly fitting within the annular tube;

a damping barrier in fixed position near one end of the annular tube and remote from the movable piston, the compression chamber being on one side of the damping barrier and a damping chamber being on another side of the damping barrier; and a first valve adjacent the damping barrier and operatively between the compression chamber and the damping chamber and permitting the compressible gas to flow between the compression chamber and the damping chamber, the first valve comprising a first bias, the first bias at least partially contributing to an effective force applied to a blocker, the effective force capable of being overcome by a threshold level of force of compressed gas in the compression chamber.

12. The suspension unit for a bicycle according to claim 11, further comprising a second valve operatively between the compression chamber and the damping chamber and permitting the compressible gas to flow between the damping chamber and the compression chamber, the second valve comprising a second bias capable of being overcome by a threshold level of force of compressed gas in the damping chamber.

13. The suspension unit for a bicycle according to claim 12, wherein the second valve further comprises a shim.

14. The suspension unit for a bicycle according to claim 13, wherein the second bias comprises a second spring urging the shim into a closed position.

15. The suspension unit for a bicycle according to claim 11, wherein the first bias comprises a first blocker formed at least in part from a resilient material.

16. The suspension unit for a bicycle according to claim 15, further comprising an adjuster operatively connected to the first blocker capable of adjusting an effective spring force of the resilient material.

17. The suspension unit for a bicycle according to claim 12, wherein the second valve is positioned adjacent at least one of the damping barrier and the shaft.

18. The suspension unit for a bicycle according to claim 11, wherein the damping barrier is connected to the first annular tube in a substantially fixed position.

19. The suspension unit for a bicycle according to claim 18, wherein the damping barrier is connected to the first annular tube using a shaft that is annular along at least a portion of its length.

20. The suspension unit for a bicycle according to claim 19, wherein the first valve is positioned adjacent at least one of the damping barrier and the shaft.

21. The suspension unit for a bicycle according to claim 19, wherein the damping barrier and the shaft at least partially define a serpentine passageway.

22. The suspension unit for a bicycle according to claim 11, wherein the first valve further comprises a first blocker and the first bias comprises a first spring positioned adjacent the first blocker.

23. The suspension unit for a bicycle according to claim 22, further comprising an adjuster operatively connected to the first spring capable of adjusting an effective spring force of the first spring.

24. The suspension unit for a vehicle according to claim 22, wherein the first blocker comprises a pin.

25. The suspension unit for a vehicle according to claim 22, wherein the first blocker comprises a ball.

26. The suspension unit for a bicycle according to claim 11, wherein the barrier assembly is located substantially within the annular tube.

27. A suspension unit for a bicycle, comprising:

an annular tube defining a compression chamber;

a piston slidingly interfitting with the annular tube and capable of reciprocating with respect to the annular tube, the piston capable of compressing a compressible gas in the compression chamber;

a barrier assembly remote from the piston and near one end of the annular tube, the compression chamber being on one side of the barrier assembly and a damping chamber being on another side of the barrier assembly;

a first valve operatively between the compression chamber and the damping chamber and capable of permitting the compressible gas to flow between the compression chamber and the damping chamber; and an adjuster operatively connected to the first valve and having at least three positions, wherein the adjuster is capable of adjusting an effective force capable of being overcome by a threshold level of force of compressed gas in the compression chamber, wherein a maximum effective force exists when the adjuster is in contact with a portion of the first valve.

28. The suspension unit for a bicycle according to claim 27, wherein the first valve includes a bias.

29. The suspension unit for a bicycle according to claim 28, wherein the adjuster is capable of adjusting an effective spring force of the bias.

30. The suspension unit for a bicycle according to claim 28, wherein the bias is a spring and the adjuster is capable of adjusting an effective spring force of the spring.

31. The suspension unit for a bicycle according to claim 28, wherein the bias is a resilient material from which at least a portion of the first valve is formed and the adjuster is capable of adjusting an effective spring force of the resilient material.

32. The suspension unit for a bicycle according to claim 28, wherein the first bias is adjustable by the adjuster between a first position relatively substantially allowing the flow of compressed gas from the compression chamber to the damping chamber, a second position relatively substantially restricting the flow of compressed gas from the compression chamber to the damping chamber, and at least a third position between the first position and the second position, relatively partially restricting the flow of compressed gas from the compression chamber to the damping chamber.

33. The suspension unit for a bicycle according to claim 32, wherein at least a portion of the first valve is adjustable by the adjuster between a first position relatively substantially allowing the flow of compressed gas from the compression chamber to the damping chamber, a second position relatively substantially restricting the flow of compressed gas from the compression chamber to the damping chamber, and at least a third position between the first position and the second position, relatively partially restricting the flow of compressed gas from the compression chamber to the damping chamber.

34. The suspension unit for a bicycle according to claim 27, further comprising a second valve operatively between the compression chamber and the damping chamber and capable of permitting the compressible gas to flow between the damping chamber and the compression chamber.

35. The suspension unit for a bicycle according to claim 27, wherein the adjuster is substantially infinitely adjustable between a first extreme position and a second extreme position.

36. The suspension unit for a bicycle according to claim 27, wherein the first valve comprises a blocker adjustable by the adjuster between a first position relatively substantially allowing the flow of compressed gas from the compression chamber to the damping chamber, a second position relatively substantially restricting the flow of compressed gas from the compression chamber to the damping chamber, and at least a third position between the first position and the second position, relatively partially restricting the flow of compressed gas from the compression chamber to the damping chamber.

37. A suspension unit for a bicycle, comprising:
an annular tube defining a compression chamber;
a piston slidingly interfitting with the annular tube and capable of reciprocating with respect to the annular tube, the piston capable of compressing a compressible gas in the compression chamber;
a barrier assembly remote from the piston and near one end of the annular tube and fixed with respect to the annular tube, comprising a damping barrier near one end of the annular tube, the compression chamber being on one side of the barrier assembly and a damping chamber having a substantially fixed volume and being on another side of the barrier assembly;
a first valve adjacent the barrier assembly and operatively between the compression chamber and the damping chamber and capable of permitting the compressible gas to flow between the compression chamber and the damping chamber; and
a first passageway defined between the damping chamber and the compression chamber;
wherein pressure from the compressible gas in the compression chamber is capable of variably opening the first valve, thereby changing an effective size of the first passageway.

38. The suspension unit for a bicycle according to claim 37, further comprising a second valve operatively between the compression chamber and the damping chamber and capable of permitting the compressible gas to flow between the damping chamber and the compression chamber.

39. The suspension unit for a bicycle according to claim 37, wherein the first valve further comprises a first bias.

40. The suspension unit for a bicycle according to claim 39, the first valve further comprising a first blocker, and wherein an effective spring force applied by the first bias to the first blocker at least partially defines a threshold level of force in the compression chamber capable of opening the first valve.

41. The suspension unit for a bicycle according to claim 39, wherein the first bias is a spring.

42. The suspension unit for a bicycle according to claim 37, wherein the first valve comprises a first blocker comprising a resilient material, and wherein an effective spring force applied by the first blocker at least partially defines a threshold level of force in the compression chamber capable of opening the first valve.

43. The suspension unit for a bicycle according to claim 37, further comprising an adjuster operatively connected to the first valve and capable of adjusting the variability of opening of the first passageway.

44. The suspension unit for a bicycle according to claim 37, wherein the first passageway is serpentine.

45. The suspension unit for a bicycle according to claim 37, wherein the barrier assembly is located substantially within the annular tube.

\* \* \* \* \*